United States Patent [19]

Shibata et al.

[11] Patent Number: 5,365,265
[45] Date of Patent: Nov. 15, 1994

[54] MULTIPOINT TELECONFERENCE SYSTEM EMPLOYING COMMUNICATION CHANNELS SET IN RING CONFIGURATION

[75] Inventors: Yoji Shibata, Yokosuka; Masaaki Takizawa, Tokyo, both of Japan

[73] Assignee: Hitachi, Ltd., Tokyo, Japan

[21] Appl. No.: 913,401

[22] Filed: Jul. 15, 1992

[30] Foreign Application Priority Data

Jul. 15, 1991 [JP]  Japan .................................. 3-174025

[51] Int. Cl.$^5$ .......................... H04N 1/42; H04N 7/14
[52] U.S. Cl. ........................................ 348/15; 348/14; 348/16; 348/17; 348/19
[58] Field of Search ................... 379/53, 54, 201, 202, 379/203, 204, 205; 358/85; 348/14, 15, 16, 17, 19

[56] References Cited

U.S. PATENT DOCUMENTS

| | | |
|---|---|---|
| 4,289,932 | 9/1981 | Reed . |
| 4,531,024 | 7/1985 | Colton et al. ........................ 379/204 |
| 4,574,374 | 3/1986 | Scordo ................................. 370/62 |
| 4,650,929 | 3/1987 | Boerger et al. ....................... 379/54 |
| 4,710,917 | 12/1987 | Tompkins et al. ..................... 379/53 |
| 4,847,829 | 7/1989 | Tompkins et al. ..................... 379/53 |

FOREIGN PATENT DOCUMENTS

| | | |
|---|---|---|
| 0349709 | 1/1990 | Germany . |
| 1-132243 | 5/1989 | Japan . |
| 1-241959 | 9/1989 | Japan . |
| 3-85837 | 4/1991 | Japan . |

*Primary Examiner*—Curtis Kuntz
*Assistant Examiner*—Jason Chan
*Attorney, Agent, or Firm*—Antonelli, Terry, Stout & Kraus

[57] ABSTRACT

A multipoint teleconference system dispensing with an MCU, in which terminals are connected into a loop configuration through an ISDN in such a way that each terminal is coupled with each of the adjacent terminals by a single B channel. Thus, a communication frame is revolved through a looped communication channel. Each terminal renews video data which is contained in an allotted area within the received communication frame and which was transmitted by the terminal itself, and it relays the resulting communication frame to the next terminal.

16 Claims, 23 Drawing Sheets

INSTRUCTION OF VIDEO PATH CHANGE-OVER BY CHAIRPERSON END A, OR AUTOMATIC AUDIO CHANGE-OVER
(B TRANSMISSION → C TRANSMISSION)

FIG. 6

| | | | BIT NOS. | | | | | OCTET NOS. |
|---|---|---|---|---|---|---|---|---|
| 1 | 2 | 3 | 4 | 5 | 6 | 7 | 8 | |
| 1 | 2 | 3 | 4 | 5 | 6 | 7 | F A S | 1 |
| . | . | . | . | . | . | . | | 2 |
| . | . | . | . | . | . | . | | . |
| . | . | . | . | . | . | . | | . |
| . | . | . | . | . | . | . | | . |
| 50 | 51 | 52 | 53 | 54 | 55 | 56 | | 8 |
| 57 | 58 | 59 | 60 | 61 | 62 | 63 | | 9 |
| . | . | . | . | . | . | . | | 10 |
| . | . | . | . | . | . | . | B A S | . |
| . | . | . | . | . | . | . | | . |
| . | . | . | . | . | . | . | | . |
| 106 | 107 | 108 | 109 | 110 | 111 | 112 | | 16 |
| 113 | 114 | 115 | 116 | 117 | 118 | 119 | | 17 |
| 120 | 121 | 122 | 123 | 124 | 125 | 126 | | 18 |
| . | . | . | . | . | . | . | SUB-CHANNEL #8 | . |
| . | . | . | . | . | . | . | | . |
| . | . | . | . | . | . | . | | . |
| . | . | . | . | . | . | . | | . |
| 554 | 555 | 556 | 557 | 558 | 559 | 560 | | 80 |

| P S C | T R | P T Y P E | P E I | P S P A R E | G O B 1 | G O B 2 | G O B 3 | G O B 4 | G O B 5 | G O B 6 | G O B 7 | G O B 8 | G O B 9 | G O B 10 | G O B 11 | G O B 12 |
|---|---|---|---|---|---|---|---|---|---|---|---|---|---|---|---|---|

| P S C | T R | P T Y P E | P E I | P S P A R E | G O B 1 | G O B 3 | G O B 5 | G O B 2 | G O B 4 | G O B 6 | G O B 7 | G O B 9 | G O B 11 | G O B 8 | G O B 10 | G O B 12 |
|---|---|---|---|---|---|---|---|---|---|---|---|---|---|---|---|---|

END A    710    END B   711   END C   712   END D

FIG. 7 (c)

| P S C | T R | P T Y P E | P E I | P S P A R E | G O B 1 | G O B 2 | G O B 3 | G O B 4 | G O B 5 | G O B 6 | G O B 7 | G O B 8 | G O B 9 | G O B 10 | G O B 11 | G O B 12 |
|---|---|---|---|---|---|---|---|---|---|---|---|---|---|---|---|---|

| | | | | | | | | | | | | |
|---|---|---|---|---|---|---|---|---|---|---|---|---|
| END A | O | B | O | B | O | B | B | B | B | B | B | B |
| END B | B | O | B | O | B | O | B | B | B | B | B | B |
| END C | B | B | B | B | B | B | O | B | O | B | O | B |
| END D | B | B | B | B | B | B | B | O | B | O | B | O |

O : GOB CONTAINING VALID VIDEO DATA

B : ONLY GOB HEADER, NOT CONTAINING VALID DATA

FIG. 7 (d)

| P S C | T R | P T Y P E | P E I | P S P A R E | G O B i | G O B i+1 | G O B i+2 |
|---|---|---|---|---|---|---|---|

| GOB NO / END | GOB i | GOB i+1 | GOB i+2 |
|---|---|---|---|
| END A | 1 | 3 | 5 |
| END B | 2 | 4 | 6 |
| END C | 7 | 9 | 11 |
| END D | 8 | 10 | 12 |

FIG. 8 (a)

1-IMAGE DISPLAY

| 1 | 2 |
|---|---|
| 3 | 4 |
| 5 | 6 |
| 7 | 8 |
| 9 | 10 |
| 11 | 12 |

PICTURE TO BE SENT BY END B (OR C), (CIF)

FIG. 8 (b)

2-IMAGE DISPLAY

| 1 | 2 |
|---|---|
| 3 | 4 |
| 5 | 6 |

PICTURE TO BE SENT BY END A,
($\frac{1}{2}$ OF CIF)

| 7 | 8 |
|---|---|
| 9 | 10 |
| 11 | 12 |

PICTURE TO BE SENT BY END D,
($\frac{1}{2}$ OF CIF)

FIG. 8 (c)

4-IMAGE DISPLAY

| 1 | 2 | 7 | 8 |
|---|---|---|---|
| 3 | 4 | 9 | 10 |
| 5 | 6 | 11 | 12 |

PICTURE TO BE SENT BY END A | PICTURE TO BE SENT BY END B | PICTURE TO BE SENT BY END C | PICTURE TO BE SENT BY END D

FIG. 14 (a)

| OCTET NOS. → | 17 | 25 | 33 | 41 | 49 | 57 | 65 | 73 | 80 |

MLP-6.4K
(6.4kb/s)

| COMMON CHANNEL | NO. 1 | NO. 2 | NO. 3 | NO. 4 | NO. 5 | NO. 6 | NO. 7 SPERE |
|---|---|---|---|---|---|---|---|

FIG. 14 (b)

| OCTET NOS. → | 41 | 49 | 57 | 65 | 73 | 80 |

MLP-4K
(4kb/s)

| COMMON CHANNEL | NO. 1 | NO. 2 | NO. 3 | NO. 4 SPERE |
|---|---|---|---|---|

↑ END B    ↑ C    ↑ D    ↑ (E)

COMMAND AND DATA IN IDENTICAL FRAME

← BIT NOS.

COMMAND AND DATA IN SEPARATE FRAMES

FIG. 22

| FIRST CHANNEL | | | | | | | | ADDITIONAL CHANNEL | | | | | | | |
|---|---|---|---|---|---|---|---|---|---|---|---|---|---|---|---|
| BIT1 | 2 | 3 | 4 | 5 | 6 | 7 | 8 | 1 | 2 | 3 | 4 | 5 | 6 | 7 | 8 |
| A1 | A2 | A3 | A4 | A5 | A6 | V1 | FAS | V2 | V3 | V4 | V5 | V6 | V7 | V8 | FAS |
| A | . | . | | . | . | V9 | | V10 | | | | | | V16 | |
| . | . | | | | . | V121 | BAS | V122 | | | | | | | BAS |
| . | | | | | | V129 | | V131 | | | | | | V128 | V138 |
| . | | | | | | V139 | V139 | | | | | | | V137 | V148 |
| . | . | | | . | . | ... | . | | | | | | | . | ... |
| A | . | | | . | A | V759 | | | | | | | | . | V768 |

F I G. 23
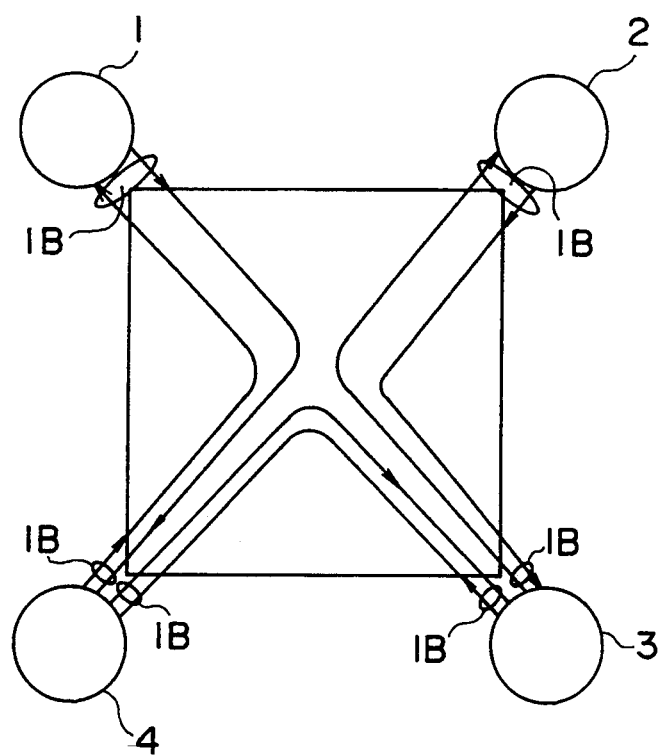

MULTIPOINT TELECONFERENCE SYSTEM EMPLOYING COMMUNICATION CHANNELS SET IN RING CONFIGURATION

BACKGROUND OF THE INVENTION

1. Field of the Invention

The present invention relates to a teleconference/telephone terminal. More particularly, it relates to a multipoint teleconference system wherein a conversation or a conference is had by connecting teleconference/telephone terminals at three or more multiple points or spots.

2. Description of the Related Art

As a multipoint teleconference system in the prior art, there has been known one proposed in the CCITT (International Telegraph and Telephone Consultative Committee) Recommendation H. 320.

In order to realize a multipoint teleconference, the multipoint teleconference system is equipped with an MCU in addition to teleconference/telephone terminals (hereinbelow, simply termed "ends"). Herein, the multipoint teleconference is held in such a way that all the ends to attend this teleconference are connected with the MCU, and that the MCU controls communications among multiple points.

Since the prior-art multipoint teleconference system realizes the multipoint teleconference as stated above, it poses the following problems:

(1) The number of ends which can attend the multipoint teleconference, and the transmission speed of the communications are limited by the admitting capacity of the MCU.

(2) Even in the state in which all the ends of the pertinent group can attend the multipoint teleconference, this teleconference cannot be held when the MCU is not operating or when all available MCU's are busy or occupied for the multipoint teleconferences of other groups.

(3) In a case where the MCU lies at a point distant from the ends which attend the multipoint teleconference, the communications become expensive,

SUMMARY OF THE INVENTION

The present invention therefore has for its object to provide a multipoint teleconference system in which a multipoint teleconference can be realized by only the ends attending this teleconference, without requiring any MCU.

The present invention consists of a multipoint video telephone/teleconference system having a plurality of video telephone/teleconference terminals which are connected to digital communication channels and which transmit and receive communication frames containing video telephonic/teleconferential data, through the connected digital communication channels and has the following characteristics.

The digital communication channels connect the plurality of video telephone/teleconference terminals in a ring configuration. Each video telephone/teleconference terminal comprises a generation device for generating the video telephonic/teleconferential data which is to be sent to the other video telephone/teleconference terminals, a relay device for transmitting the communication frame received from the video telephone/teleconference terminal at an upper stream position of a loop to the video telephone/teleconference terminal at a lower stream position of the loop so that the communication frames may revolve around the loop which is formed of the digital communication channels which connect the plurality of video telephone/teleconference terminals to one another, a transmission device for entering the generated video telephonic/teleconferential data into the communication frame which is to be relayed by the relay device, thereby sending the generated video telephonic/teleconferential data to the other video telephone/teleconference terminals which lie on the loop, and a cancellation device for canceling the video telephonic/teleconferential data which was entered into the communication frame by the transmission device of the video telephone/teleconference terminal itself before and which has revolved around the loop, from within the communication frame which is to be relayed by the relay device.

According to the multipoint teleconference system of the present invention, each video telephone/teleconference terminal causes the communication frame to revolve around the loop constituted by the digital communication channels which connect the plurality of video telephone/teleconference terminals to one another. In addition, each terminal enters the generated video telephonic/teleconferential data into the communication frame which is to be relayed, thereby sending the generated data to the other video telephone/teleconference terminals on the loop. Besides, each terminal cancels the video telephonic/teleconferential data transmitted by itself before, from within the communication frame having revolved around the loop, thereby avoiding the double transmission of the video telephonic/teleconferential data and the stocking of such unnecessary video telephonic/teleconferential data.

BRIEF DESCRIPTION OF THE DRAWINGS

FIG. 6 is an explanatory diagram showing the format of a frame stipulated in the CCITT Recommendation H. 221;

FIGS. 7(a) thru 7(d) are diagrams for explaining a frame stipulated in the CCITT Recommendation H. 261, and examples of use of the frame in the embodiment of the present invention;

FIGS. 8(a) thru 8(c) are diagrams for explaining the relationships in the embodiment between GOB's stipulated in the CCITT Recommendation H. 261 and video data;

FIGS. 14(a) and 14(b) are explanatory diagrams showing schemes for transmitting control information in the embodiment;

FIG. 22 is an explanatory diagram showing a frame format which employs an additional channel stipulated in the CCITT Recommendation H. 221; and FIG. 23 is a schematic diagram showing a multipoint teleconference system according the second embodiment of the present invention.

DETAILED DESCRIPTION OF THE PREFERRED EMBODIMENTS

Now, an embodiment of a multipoint teleconference system according to the present invention will be described.

Figure 1:
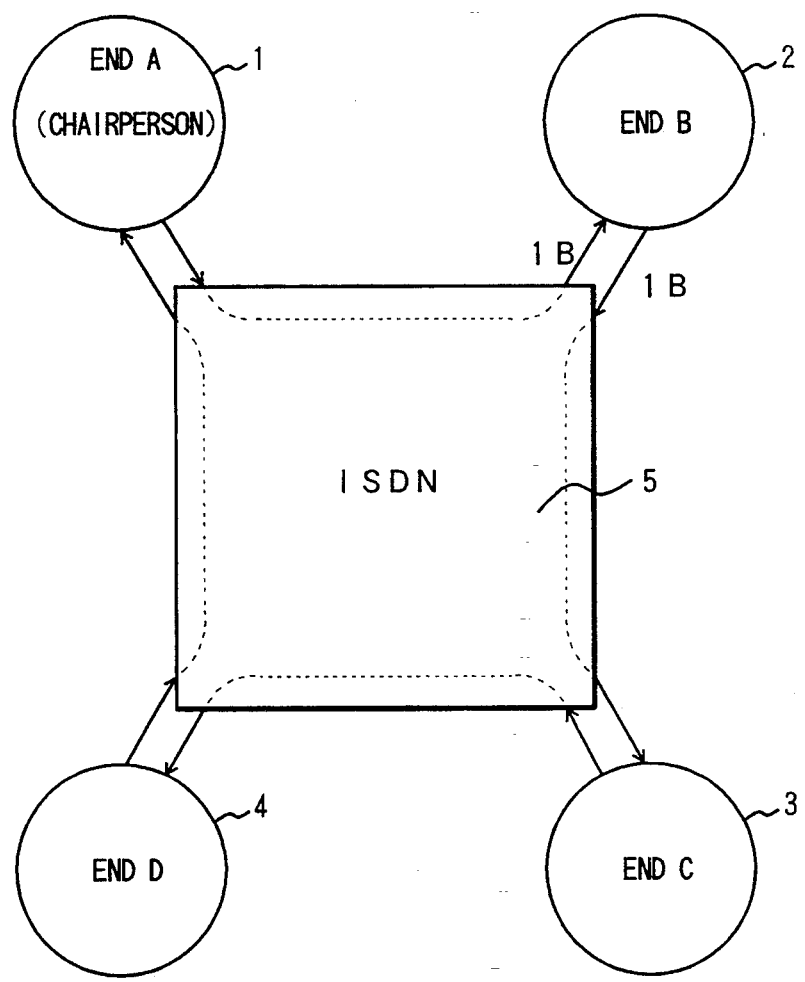
FIG. 1 is a schematic diagram showing the architecture of a multipoint teleconference system according to an embodiment of the present invention.

First, FIG. 1 illustrates the architecture of the multipoint teleconference system in this embodiment, under the assumption that the number of ends or terminals which attend a multipoint teleconference is four.

Referring to the figure, numerals 1, 2, 3 and 4 indicate the ends, and numeral 5 indicates a digital communications network. Here in this embodiment, the end A at numeral 1 is a chairperson end which takes charge of the functions of the chairperson of the multipoint teleconference. Incidentally, in this embodiment, an ISDN stipulated in the CCITT Recommendations I-Series is assumed as the digital communications network 5. Also, for the brevity of the description, it is supposed that each of the ends is connected with the ISDN by a fundamental interface of 2B+D.

In this embodiment, the individual ends attending the multipoint teleconference are connected in the shape of a loop. More specifically, as shown in the FIG. 1, the end-A 1 is connected to the end-D 4 and the end-B 2 by separate B channels, the end-B 2 to the end-A 1 and the end-C 3, the end-C 3 to the end-B 2 and end-D 4, and the end-D 4 to the end-C 3 and the end-A 1.

Figure 2:
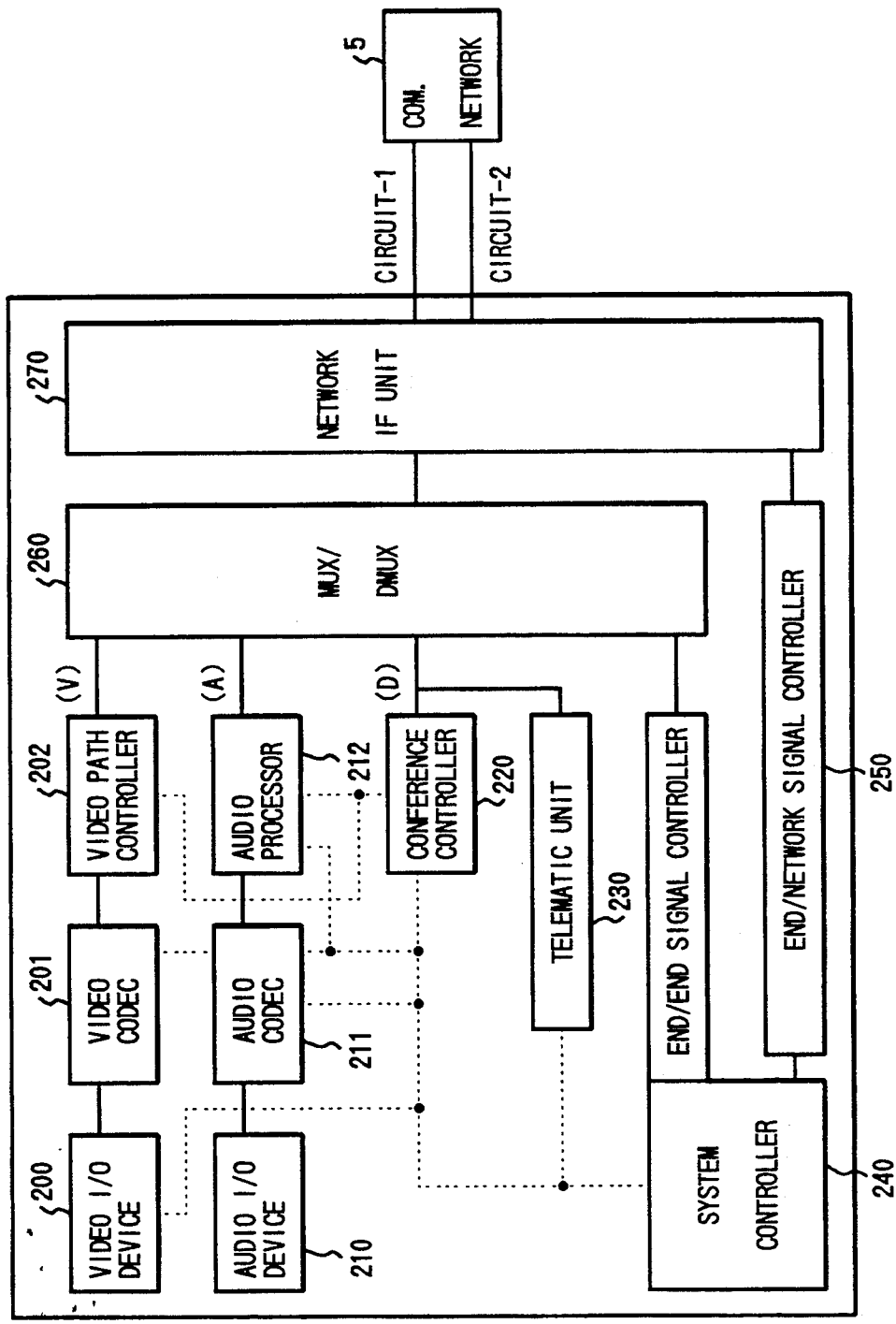
FIG. 2 is a block diagram showing the construction of a multipoint video telephone/teleconference terminal in the embodiment of the present invention.

Next, FIG. 2 illustrates the construction of each end in this embodiment.

Referring to the FIG., the end includes a video input/output device 200 such as a CRT or video camera, a video codec 201 which codes/decodes video information, a video path controller 202 which multiplexes/demultiplexes video information, an audio input/output device 210 such as a loudspeaker or microphone, an audio codec 211 which codes/decodes audio information, an audio processor 212 which processes audio information, a conference controller 220 which performs the controls of various parts attendant upon the multipoint teleconference, a telematic unit 230, a system controller 240 which controls the entire end, an end-/network signal controller 250 which performs communication controls such as a call control between the end and the digital communications network 5, an MUX-/DMUX (multiplexor/demultiplexor) 260 which performs the framing process of H. 221 frames to be described later, and a network interface unit 270 which takes charge of the interface of a lower layer with the network 5. In addition, the system controller 240 is furnished with an end/end signal controller which processes control data and notification data sent to the pertinent end or to be sent to the other ends.

Among these constituents, the video I/O device 200, video codec 201, audio I/O device 210, audio codec 211, telematic unit 230, system controller 240, end/network signal controller 250, MUX/DMUX 260, network interface unit 270 and end/end signal controller have the same details as stipulated in CCITT Recommendations H. 320, H. 221, H. 242 and H. 261, and their operations in ordinary one-to-one communications are also as stipulated in the above recommendations. In the ensuing description, therefore, those points of difference from the ordinary one-to-one communications which arise in the execution of the multipoint teleconference will be chiefly elucidated.

Now, the operation of the multipoint teleconference system of this embodiment will be outlined.

FIGS. 3(a) and 3(b), FIG. 4, and FIG. 5 illustrate the situations of video outputs from the video I/O devices 200 of the respective ends and audio outputs from the audio I/O devices 210 as to the case where the four ends A, B, C and D are holding the multipoint teleconference.

Figure 3:
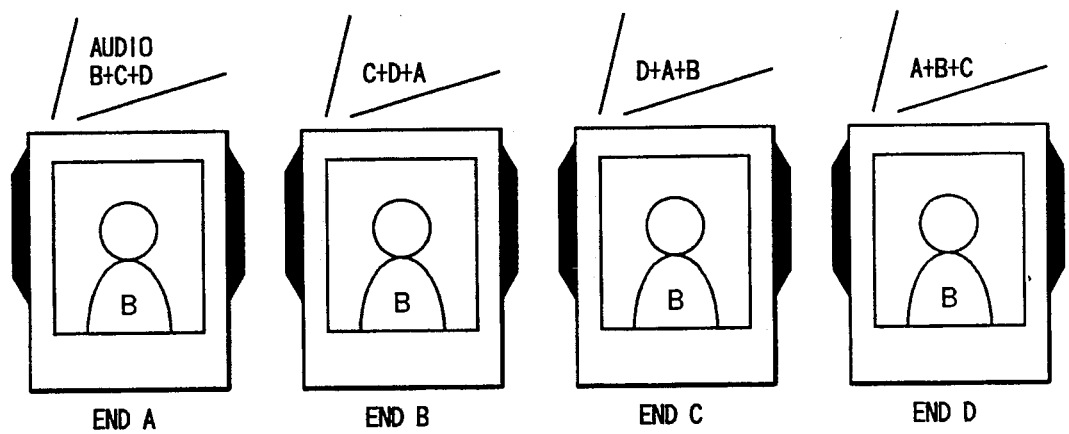
FIGS. 3(a) and 3(b) are explanatory views showing the operation of the multipoint teleconference system of the embodiment.
Figure 3:
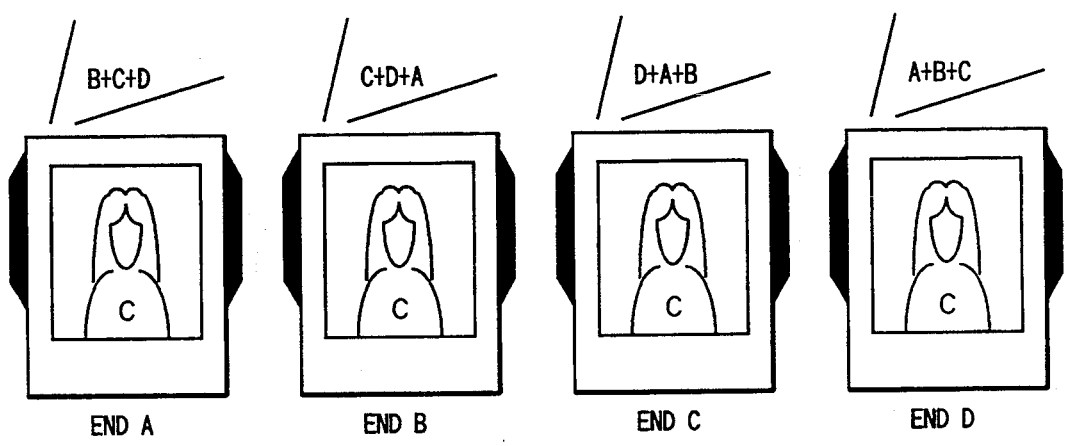

In an example depicted in FIGS. 3(a) and 3(b), all the ends present video information transmitted from one of the ends, as display outputs. FIG. 3(a) shows the state in which the video information transmitted from the end B is presented as the display outputs by all the ends A, B, C and D. Usually, the source end of the video information is the end which is used by a speaker in the conference. This source end is determined in compliance with an instruction from the chairperson end, or it is automatically determined to be the end which is transmitting the audio information of the highest level. FIG. 3(b) shows the state in which the source end of the video information has changed-over from the end B to the end C.

On the other hand, the audio outputs of the respective ends do not depend upon the displayed video information, but they are produced by mixing all the items of audio information received from the other ends attending the conference. Herein, the audio information transmitted by the pertinent end itself is prevented from being output in the pertinent end, by the use of an echo canceling technique.

More specifically, in the example depicted in FIGS. 3(a) and 3(b), the audio information items transmitted from the ends B, C and D are output by the end A; those transmitted from the ends A, C and D are output by the end B; those transmitted from the ends A, B and D are output by the end C; and those transmitted from the ends A, B and C are output by the end D.

Figure 4:
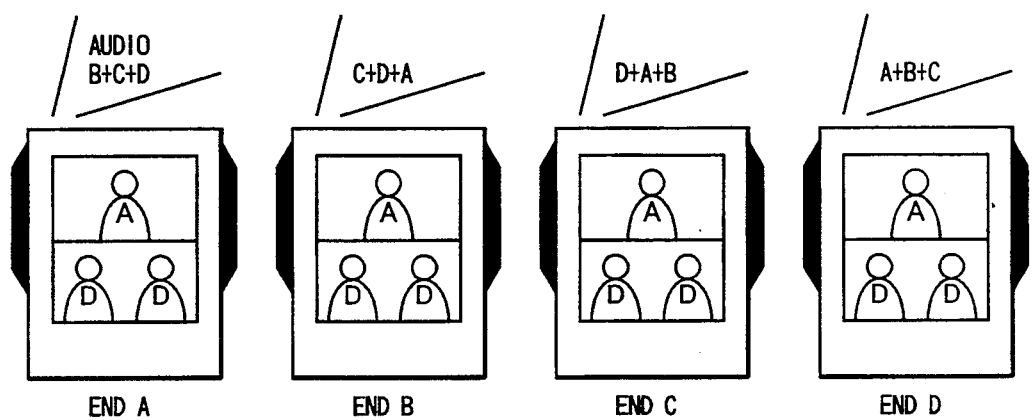
FIG. 4 is an explanatory view showing the operation of the multipoint teleconference system.

In an example depicted in FIG. 4, all the ends present two items of video information transmitted from two different ends, as display outputs. FIG. 4 shows the state in which the two video information items transmitted from the ends A and D are respectively displayed in the upper and lower parts of the display units of all the ends A, B, C and D. Also in this case, the two source ends to transmit the display outputs are determined in compliance with an instruction from the chairperson end, or they are automatically determined to be the two ends which are transmitting the audio information items of the highest level and the second-highest level.

In the case of FIG. 4, as in the foregoing case of FIGS. 3(a) and 3(b), speech is emitted by mixing all the items of audio information received from the other ends attending the conference, irrespective of the output video information items.

Figure 5:
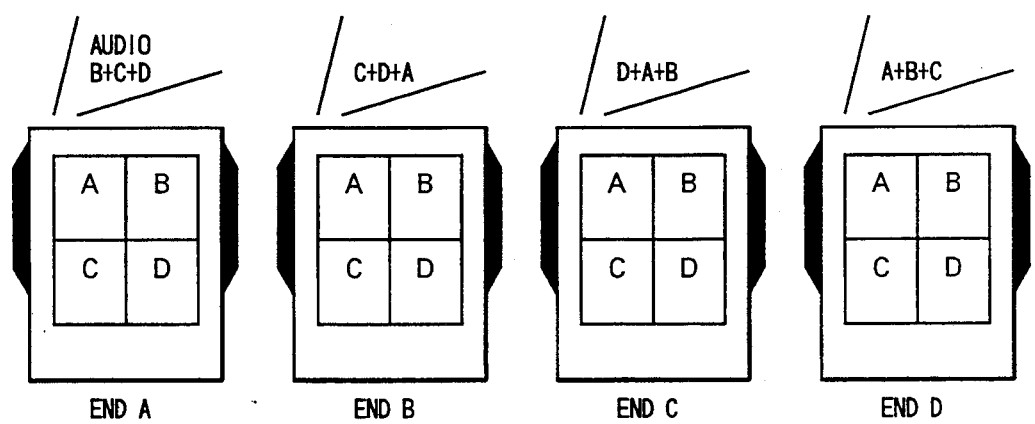
FIG. 5 is an explanatory view showing the operation of the multipoint teleconference system.

In an example depicted in FIG. 5, each of the ends presents the four video information items of all the ends attending the teleconference, as a display output. FIG. 5 shows the state in which the video information items of the ends A, B, C and D are respectively displayed on the quartered areas of the screen of the display unit of each end.

In the case of FIG. 5, as in the foregoing case of FIGS. 3(a) and 3(b), speech is emitted by mixing all the items of audio information received from the other ends attending the conference, irrespective of the output video information items.

In a case where five or more ends or terminals have a multipoint teleconference, four source ends to transmit display outputs are determined in compliance with an instruction from the chairperson end, or they are automatically determined to be the four ends in the order in which audio information items transmitted therefrom have higher levels.

Next, there will be explained the communication frames which are employed for the communications among the ends in this embodiment.

Here in the embodiment, the frame recommended in the provisions H. 221 of the CCITT (termed "H. 221 frame" in this specification) is used for the communication frames among the ends.

FIG. 6 illustrates the format of the H. 221 frame.

Referring to the FIG., an FAS at numeral 600 is used for frame synchronization, a BAS at numeral 601 is used for transmitting a command, an end capacity etc., and a subchannel #8 at numeral 602 is used for, for example, the transmission of an MLP message. The other area 603 is used for transmitting video data, audio data and user data.

The allotments of the area 603 to the video data, audio data and user data are designated by the commands and end capacity in the BAS 601.

The multipoint teleconference system of this embodiment will be detailed below.

Device and expedients for realizing the video outputs of the multipoint teleconference system as shown in FIGS. 3(a) and 3(b), FIG. 4 and FIG. 5 will be explained under the assumed condition that the four ends or terminals A, B, C and D are connected in the loop configuration as shown in FIG. 1.

First, a transmission frame for the video data of each end will be explained. The video data is obtained in such a way that video information accepted by the video I/O device 200 is coded by, for example, the DCT in the video codec 201. Besides, the transmission frame of the video data is entered into that part of the area 603 of the H. 221 frame which is allotted to the video data.

Here in the embodiment, a frame conforming to the CCITT Recommendation H. 261 (hereinbelow, termed "H. 261 frame") is used for the transmission frame of the video data.

FIGS. 7(a) thru 7(d) are diagrams for explaining the H. 261 frame.

FIG. 7(a) illustrates the format of the H. 261 frame.

As shown in FIG. 7(a), the H. 261 frame is comprised of a header part consisting of a PSC 701, a TR 702, a PTYPE 703, a PEI 704 and a PSPARE 705, and a data part consisting of GOB's 1~12. The PSC 701 indicates synchronizing data, while the TR 702 indicates the sequence No. of the circulating system of a packet.

One picture frame is formed of the video data entered into the GOB's 1~12. That is, each of the GOB's 1~12 contains the video data of a picture area which is obtained by dividing one picture frame by 12. In this regard, FIG. 8(a) shows the relationship between the GOB's 1~12 and the areas within the picture frame.

In the case of FIGS. 3(a) and 3(b) where the video information from one end is output and displayed by all the ends, the source end of the video information presents the video information accepted by the video I/O device 200, as the display output, and it generates the H. 261 frame by entering the video data into the GOB's 1~12 and then transmits the generated frame. Each of the other ends receives the transmitted H. 261 frame and presents the video data of the received frame as the display output, and it relays and transmits the received H. 261 frame to the next destination end. When the H. 261 frame transmitted by the source end has revolved through the communication channels connecting the ends and has returned to the source end itself, this source end presents the video data of the H. 261 frame as the display output, and it discards data transmitted by itself before.

FIG. 7(b) illustrates an example of use of the H. 261 frame in the foregoing case of FIG. 5 where the four video information items of all the ends attending the teleconference are output by each end. In this example, the GOB's 1, 3 and 5 are allotted to the end A; those 2, 4 and 6 to the end B; those 7, 9 and 11 to the end C; and those 8, 10 and 12 to the end D. In this regard, FIG. 8(c) illustrates the relationship between the GOB's allotted to the respective ends and the picture areas of the screen of each display unit.

Now that the end A is the chairperson end, it codes video information accepted at a reduction rate of ¼ by the video I/O device 200, and it generates the H. 261 frame by entering the resulting video data into the GOB's 1, 3 and 5 and then transmits the generated frame. The end B receives the H. 261 frame and presents the video information indicated by the GOB's 1~12 of the H. 261 frame, as the display output. In addition, the end B codes video information accepted at the reduction rate of ¼ by the video I/O device 200, and it enters the new video data of its own into the GOB's 2, 4 and 6 of the received H. 261 frame and then transmits the resulting H. 261 frame to the next destination end.

Likewise to the end B, each of the ends C and D receives the H. 261 frame and presents the video information indicated by the video data of the GOB's, as the display output. In addition, it codes video information accepted at the reduction rate of ¼ by the video I/O device 200, and it enters its own video data into the allotted GOB's of the received H. 261 frame and then transmits the resulting H. 261 frame to the next destination end.

When the H. 261 frame transmitted by the end A has revolved through the communication channels connecting the ends and has returned to the end A itself, this end A presents the video information indicated by the video data of the GOB's of the H. 261 frame, as the display output. Besides, the end A codes video information accepted at the reduction rate of ¼ by the video I/O device 200, it enters the new video data of its own into the GOB's 1, 3 and 5 of the received H. 261 frame, and it transmits the H. 261 frame to the end B after renewing the header thereof as required.

In the case of FIG. 4 where the two video information items transmitted from the two different ends are output by each of the ends, the GOB's are allotted to the two source ends as illustrated in FIG. 8(b). In this case, the ends other than the source ends perform only the operation of displaying the video data items of the received H. 261 frames and the operation of relaying the H. 261 frames. Further, in a case where the end A does not serve as the source end, it performs only the frame generating process, the frame relaying process, and the operation of displaying the video data of the H. 261 frame.

Meanwhile, FIGS. 7(c) and 7(d) illustrate different examples of use of the H. 261 frame in the foregoing case of FIG. 5 where the four video information items of all the ends attending the teleconference are output by each of the ends.

The example depicted in FIG. 7(c) is such that, not only the GOB's, but also the header is allotted to each end. Herein, each end enters its own video data of the video information reduced to ¼, into the allotted GOB's of the corresponding H. 261 frame, and it affixes only the predetermined header into the remaining GOB's without entering any data, whereupon it transmits the resulting H. 261 frame. On the other hand, each end presents video data items contained in the GOB's allotted to the respective ends having the corresponding H. 261 frames, as the display outputs in the areas corresponding to the GOB's on the basis of the received H. 261 frames. In addition, when the H. 261 frame transmitted from each of the ends has revolved through the communication channels connecting the ends around the loop and has returned to the end itself, it enters the new video data of its own into the allotted GOB's and renews the header of the frame as required, whereupon it transmits the resulting frame. Owing to such operations, one picture frame is comprised of the four H. 261 frames.

The example depicted in FIG. 7(d) is such that, in the example of FIG. 7(c), each of the ends omits the GOB's containing only the predetermined header information, from within the H. 261 frame.

It is controlled by the video path controller 202 (refer to FIG. 2) of each end to enter the video data of the end itself into the allotted GOB's of the received H. 261 frame and then relay and transmit the resulting frame as stated above.

The video path controller 202 will be detailed below.

There will be explained the first example of the video path controller 202 for treating the H. 261 frame shown in FIG. 7(b) in which the GOB's are successively allotted to the different ends.

Figure 9:
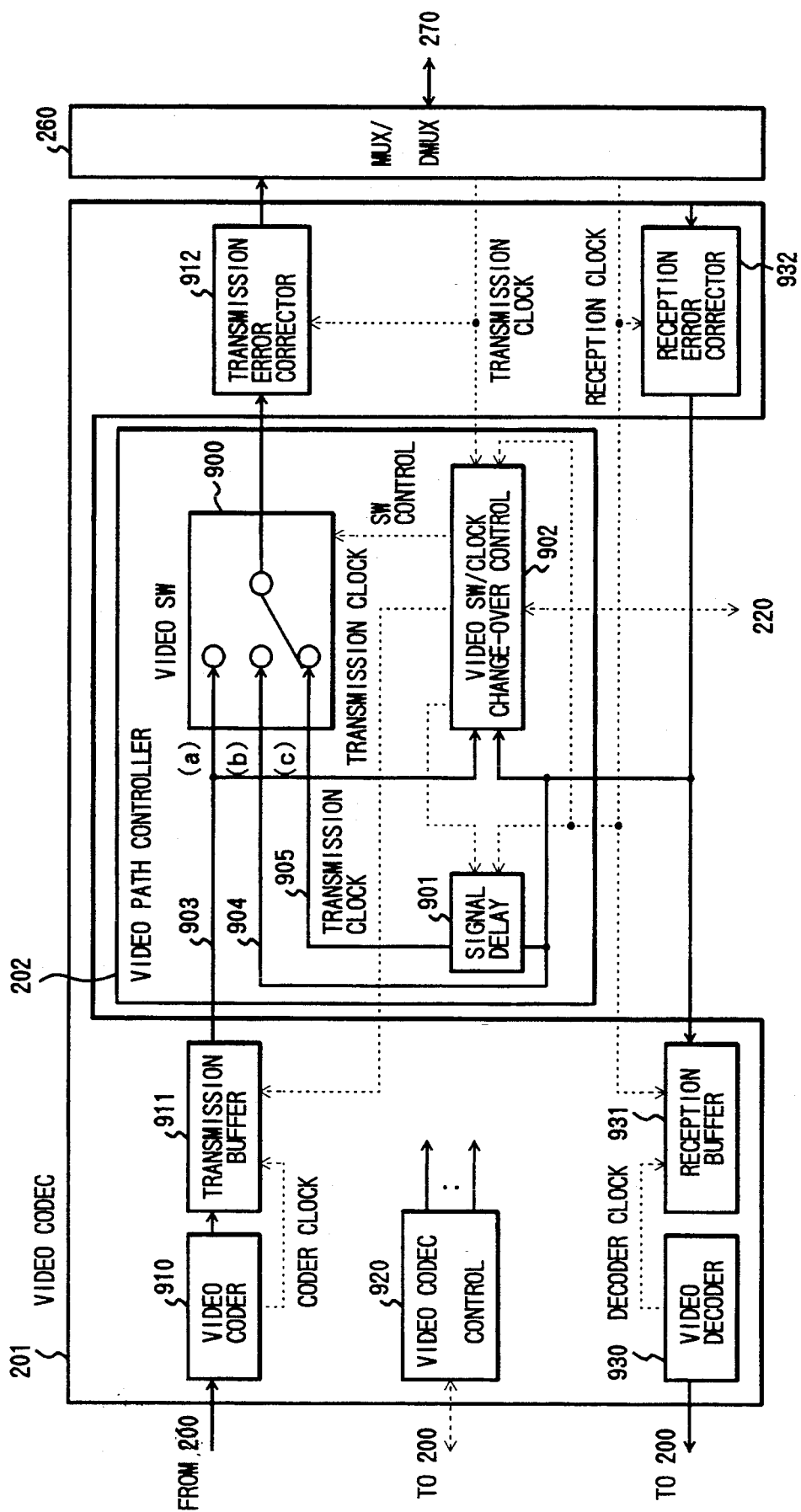
FIG. 9 is a block diagram showing the first example of construction of a video path controller in the embodiment.

FIG. 9 illustrates the internal construction of the video path controller 202.

Also, the video codec 201 and the MUX/DMUX 260 are illustrated in the FIG.

As shown in the FIG., the video codec 201 includes a video coder 910, a transmission buffer 911 and a transmission error corrector 912 as the transmission section of the end, while it includes a reception error corrector 932, a reception buffer 931 and a video decoder 930 as the reception section. Besides, it includes a video codec control 920 as the control section of the end.

In addition, the video path controller 202 is provided as the transmission section of the end, and it includes a video switch 900, a video switch clock change-over control 902 and signal delay device 901.

The MUX/DMUX 260 is supplied with the H. 261 frame of the H. 221 frame received through the network interface 270, and it delivers the supplied frame to the reception section of the video codec 201. Besides, the MUX/DMUX 260 generates the H. 261 frame and then generates the H. 221 frame together with the other data, and it transmits the H. 221 frame through the network interface 270.

The operation of the reception section of the end is the same as in the case of the ordinary one-to-one communications. The video codec 201 analyzes the H. 261 frame delivered from the MUX/DMUX 260 and decodes the video data of the GOB's 1~12, and it delivers the decoded information to the video I/O device 200.

The operation of the transmission section of the end is classified into three sorts corresponding to the cases stated before; the case where the end enters the video data of its own into all the GOB's 1~12 and then transmits the resulting GOB's, the case where the end transmits the received GOB's 1~12 as they are, and the case where the end enters the video data of its own into the allotted GOB's and transmits the resulting GOB's together with the received GOB's from the other source ends.

In the case where the video codec 201 has been notified by the conference controller 220 to the effect of entering the video data of the pertinent end itself into all the GOB's 1~12 and transmitting the resulting GOB's, the video coder 910 codes the video information accepted by the video I/O device 200 and generates the H. 261 frame which contains the resulting video data in the GOB's 1~12 and which is stored in the transmission buffer 911. The video SW 900 selects the data 903 from the transmission buffer 911, and delivers the H. 261 frame to the MUX/DMUX 260 through the transmission error corrector 912.

In the case where the video codec 201 has been notified by the conference controller 220 to the effect of transmitting the received GOB's 1~12 as they are, the video SW 900 selects the data 904 from the reception section and delivers the received H. 261 frame to the MUX/DMUX 260 through the transmission error corrector 912 without any change.

In the case where the video codec 201 has been notified by the conference controller 220 to the effect of entering the video data of the pertinent end itself into the allotted GOB's and transmitting the resulting GOB's together with the received GOB's of the other source ends, the video coder 910 reduces to ¼ the video information accepted by the video I/O device 200 and codes the reduced information, and it generates the H. 261 frame which contains the resulting video data in the GOB's allotted to the pertinent end and which is stored in the transmission buffer 911. The allotment of the GOB's is also notified by the conference controller 220. The video SW 900 delivers the data 903 from the transmission buffer 911 of the video codec 201 and the data 905 from the reception section delayed by the signal delay device 901, while changing them over. Herein, regarding the GOB's allotted to the pertinent end, the data 903 from the transmission buffer 911 of the video codec 201 is delivered to the MUX/DMUX 260 through the transmission error corrector 912, and regarding the other GOB's and the header of the H. 261 frame, the data 905 from the reception section is delivered to the MUX/DMUX 260 through the transmission error corrector 912. As to the chairperson end, however, regarding the GOB's allotted to the end itself and the header of the H. 261 frame, the data 903 from the transmission buffer 911 of the video codec 201 is delivered to the MUX/DMUX 260 through the transmission error corrector 912, and regarding the other GOB's, the data 905 from the reception section is delivered to the MUX/DMUX 260 through the transmission error corrector 912.

The timing of such change-over of the video SW 900 between the data 903 and the data 905 is controlled by the video clock change-over control 902. Incidentally, the delaying operation of the signal delay device 901 is performed in order to adjust the input of the data 905 to the video SW 900 for a time period required for the change-over control.

The change-over control of the video clock change-over control 902 for the video SW 900 is as detailed below.

Here in this example, it is assumed that, in transmitting the H. 261 frame, each end or terminal affixes header information PSC and TR as an end flag at a position directly succeeding the allotted GOB's, and the video clock change-over control 902 Controls the change-over of the video SW 900 on the basis of the end flag. The employment of the PSC for the end flag is based on the stipulation that the value of the PSC shall not develop in the video data.

Besides, in order to distinguish the PSC for the end flag from the PSC 701 for the H. 261 header, the former is directly followed by a fixed value "11111" as the TR. Further, the most significant bit of the TR 702 (5 bits) in the header of the H. 261 frame has its value fixed to "0". That is, Nos. 1 thru 15 are used as the sequence Nos. of the H. 261 frames.

Figure 10:
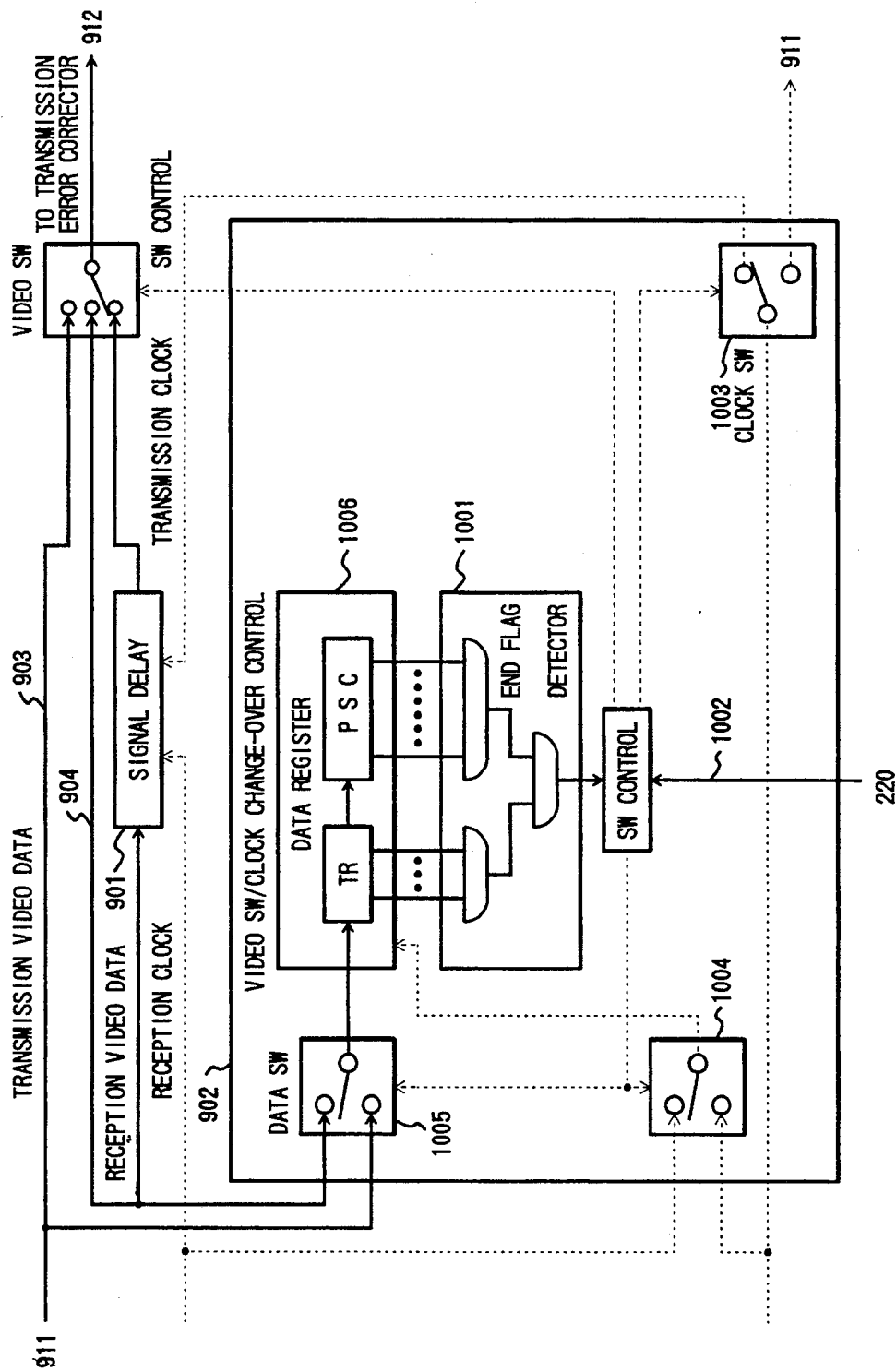
FIG. 10 is a block diagram showing the construction of a video SW/clock change-over control in the embodiment.

FIG. 10 illustrates the internal construction of the video clock change-over control 902.

Referring to the FIG., the change-over control 902 includes a data register 1006, an end flag detector 1001, a switch control 1002, and switches 1005, 1003 and 1004.

In this example, owing to the video codec 201, the H. 261 frame in which the video data obtained by coding the video information reduced to ¼ is contained in the allotted GOB's is stored in the transmission buffer 911, and the end flag composed of the PSC and the TR is entered directly behind the allotted GOB's.

It is now assumed that the video SW 900 selects the delayed data 905 from the reception section so as to deliver the selected data 905 to the transmission error corrector 912.

On this occasion, the SW 1005 selects the data 904 from the reception section, and the data register 1006 as well as the end flag detector 1001 monitors the end flag. When the end flag has been detected, the SW control 1002 is informed of the detection. Then, the SW control 1002 responsively changes-over the switches 900, 1003, 1004 and 1005. Thus, read clock pulses are sent. Consequently, the end or terminal which is not the chairperson end reads out the data of the GOB's allotted to the end itself and the end flag affixed at the immediately succeeding position as are stored in the transmission buffer 911. The end or terminal which is the chairperson end reads out the header part of the H. 261 frame, the data of the succeeding GOB's 1, 3 and 5 allotted to the end itself, and the end flag affixed at the immediately succeeding position as are stored in the transmission buffer 911.

The data 903 read out is selected by the video SW 900 in lieu of the delayed data 905 from the reception section, and is delivered to the transmission error corrector 912. As to the timing of the change-over of the video SW 900, the signal delay device 901 has its delay time adjusted so that the start position of the data 903 may lie at the start position of the end flag in the delayed data 905 from the reception section. As a result, the end flag in the delayed data 905 from the reception section disappears.

Owing to the above operation, the SW 1005 selects the data 903 from the transmission buffer 911. Therefore, the end flag of the data 903 is subsequently monitored by the data register 1006 and the end flag detector 1001. When the end flag has been detected, the SW control 1002 is informed of the detection. Then, the SW control 1002 responsively changes-over the switches 900, 1003, 1004 and 1005. Consequently, the initial state is resumed in which the delayed data 905 from the reception section is selected by the video SW 900 so as to be delivered to the transmission error corrector 912.

With the above expedient in which each end or terminal affixes the PSC and the TR as the end flag at the position directly succeeding the allotted GOB's and then transmits the H. 261 frame, the end flag information items are sometimes entered into the position which contains the GOB allotted to the next end or terminal around the looped communication channels. By way of example, in the end B, the end flag information items are sometimes entered into the position which contains the GOB 7 allotted to the end C. However, the data contained in the H. 261 frame and transmitted by the end C has already revolved through the other ends A, B and D, and it is to be renewed into new video data by the end C which ought to receive the H. 261 frame subsequently. Accordingly, no drawback arises.

Next, there will be explained the second example of the video path controller 202 for treating the H. 261 frame shown in FIG. 7(b) in which the GOB's are successively allotted to the different ends or terminals.

Figure 11:
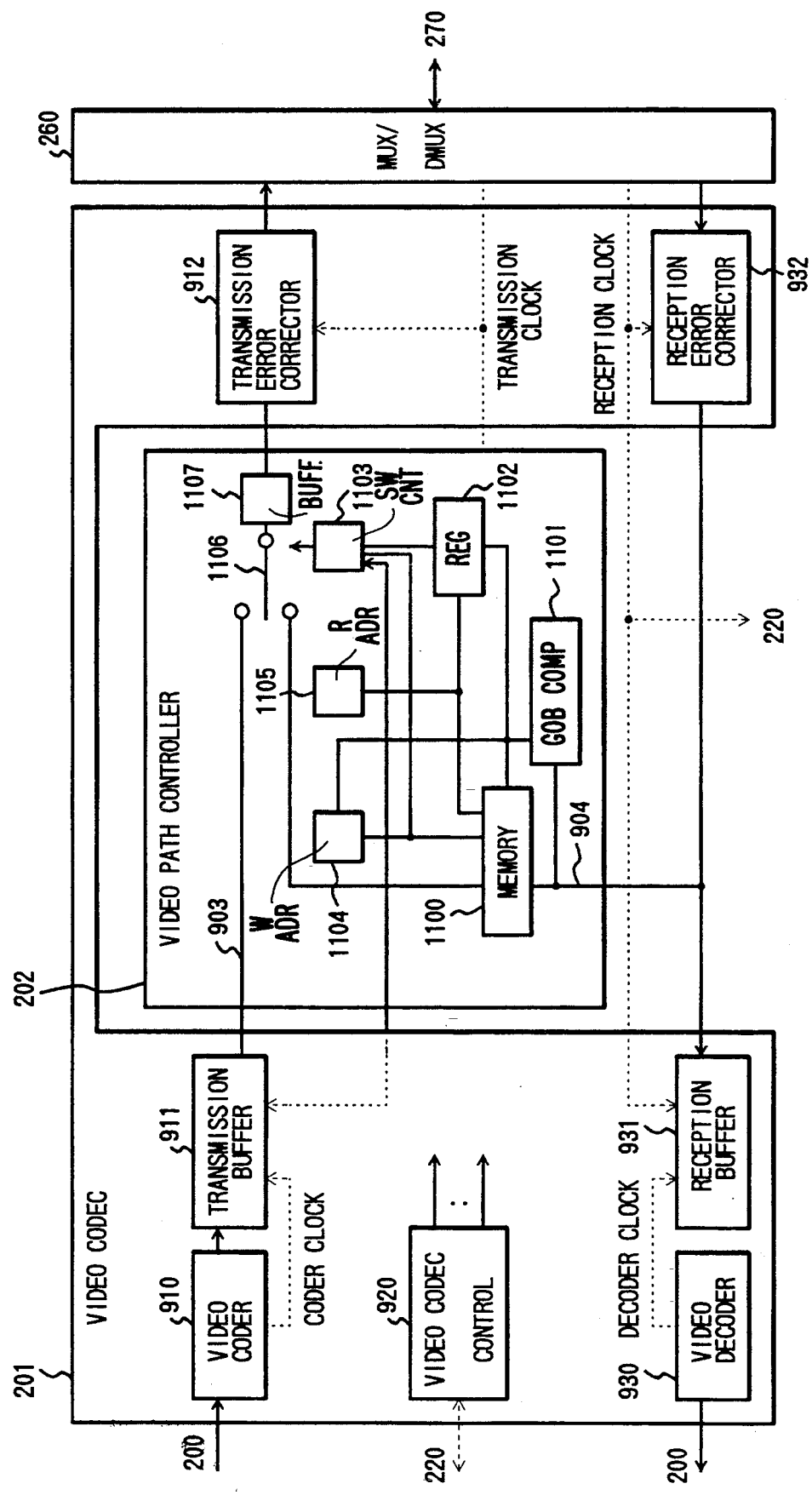
FIG. 11 is a block diagram showing the construction of an audio processor in the embodiment.

FIG. 11 illustrates the construction of the video path controller 202 in the second example.

Referring to the FIG., the video path controller 202 includes a memory 1100, a read address generator 1105 which generates the read address of the memory 1100, a write address generator 1104 which generates the write address of the memory 1100, a switch control 1103, a register 1102, a GOB comparator 1101, a video switch 1106 and a buffer for transmission 1107.

In FIG. 11, the other parts are the same as in FIG. 9 illustrative of the first example. In the video codec 201, the video coder 910 reduces to ¼ the video information accepted by the video I/O device 200 and codes the reduced video information and then enters the resulting video data into the GOB's allotted to the pertinent end itself, thereby generating the H. 261 frame, which is stored in the transmission buffer 911.

The data 904 from the reception section is stored in the memory 1100 in accordance with the output address of the write address generator 1104. The GOB comparator 1101 monitors the GOB of the data 904. Herein, when the No. of the monitored GOB indicates the GOB allotted to the pertinent end, the operation of writing the data into the memory 1101 and the operation of incrementing the address of the write address generator 1104 are suspended, and the value of the address at the time of suspension is stored in the register 1102. Thereafter, when the GOB No. of the data 904 has come to indicate any GOB other than the GOB's allotted to the pertinent end, the operation of writing the data into the memory 1101 and the operation of incrementing the address of the write address generator 1104 are restarted, and the data 904 is written into the memory 1100. The chairperson end, however, treats even the header part of the H. 261 frame similarly to the GOB's allotted to the end itself.

On the other hand, the data stored in the memory 1100 is read out in accordance with an address produced by the read address generator 1105, and it is sent to the transmission error corrector 912 through the transmitting buffer 1107 by the video SW 1106. The SW control 1103 compares the address value stored in the register 1102, with the value of the output address of the read address generator 1105. When the address values have agreed, the operation of reading out the data from the memory 1100 and the operation of incrementing the address of the read address generator 1105 are suspended, and the video SW 1106 is changed-over. Thus, the data 903 of the GOB's allotted to the pertinent end is read out of the transmission buffer 911 and is sent to the transmission error corrector 912 through the transmitting buffer 1107. In the chairperson end, however, the header part of the H. 261 frame is also read out and is sent to the transmission error corrector 912 together with the data 903 of the allotted GOB's. Thereafter, when the operation of reading out the data from the transmission buffer 911 has finished, the operation of incrementing the address of the read address generator 1105 is restarted, the video SW 1106 is changed-over, and the operation of reading out the data from the memory 1100 and then sending it to the transmission error corrector 912 is restarted.

Incidentally, in a case where the coding operation of the video codec 201 has not finished at the time of the receipt of the H. 261 frame, dummy data is entered into the allotted GOB instead of the video data. Besides, the end having received the dummy data neglects the data.

Now, there will be described devices and expedients for realizing the audio outputs of the multipoint teleconference system illustrated in FIGS. 3(a) and 3(b), FIG. 4 and FIG. 5. Here, it is assumed that the four ends or terminals A, B, C and D are connected in the loop configuration as shown in FIG. 1.

The audio data is contained in the area 603 of the H. 221 frame shown in FIG. 6.

Herein, the audio data contained in the area 603 of the H. 221 frame is obtained by mixing the audio data of all the ends which attend the multipoint teleconference. Each end receives audio data revolving around the looped communication channels and cancels audio data transmitted by the pertinent end itself before, from the received audio data, whereupon the resulting audio data is output. In addition, each end mixes audio data to be transmitted anew, into the aforementioned audio data obtained in the way that the audio data transmitted by the end itself before is canceled from the received audio data, and it transmits the resulting audio data to the next end in the loop.

It is the audio processor 212 that realizes such operations of canceling the audio data transmitted by the pertinent end itself and mixing the audio data to be transmitted anew.

The audio processor 212 will be detailed below.

Figure 12:
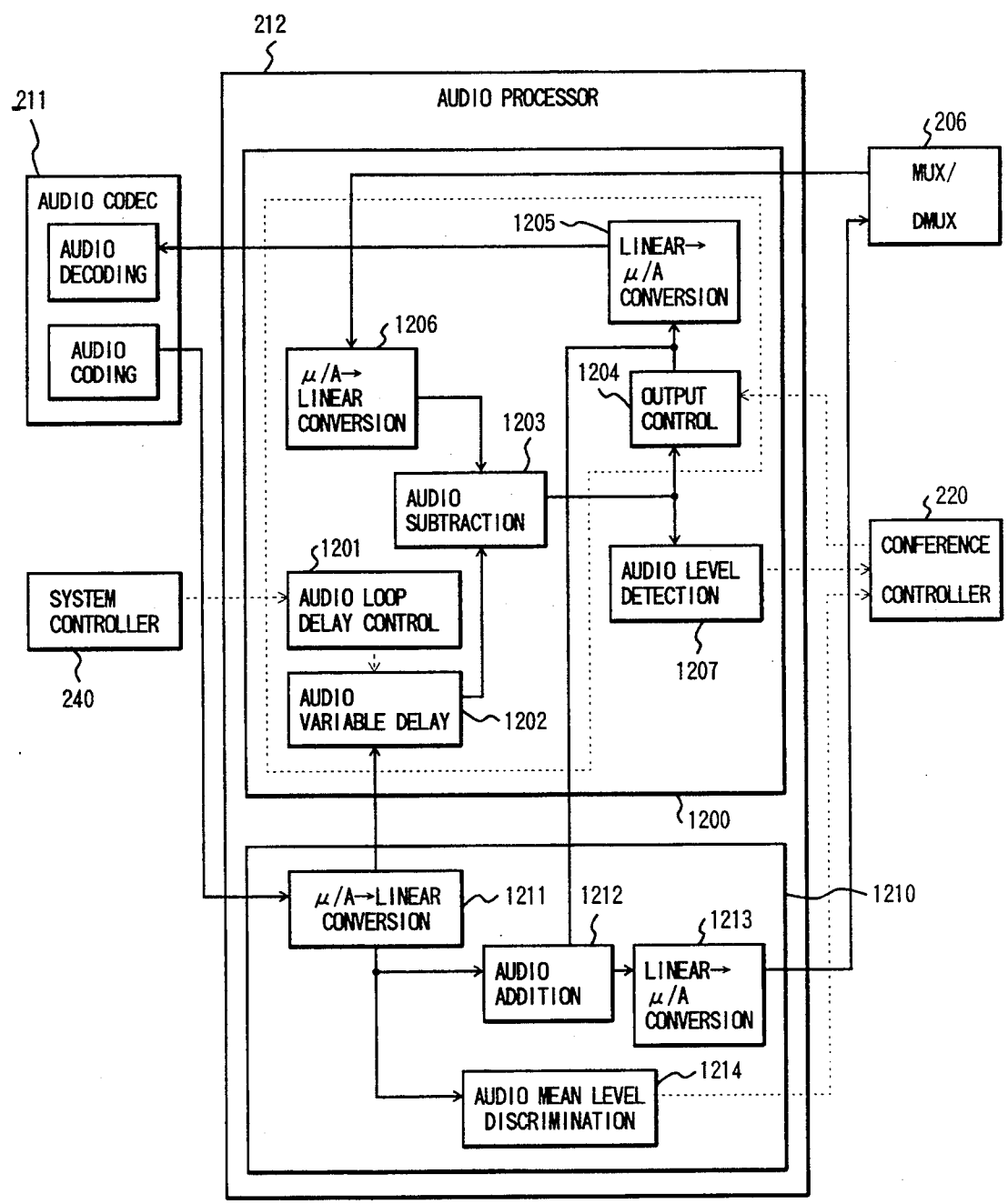
FIG. 12 is a block diagram showing an audio mean level discriminator in the embodiment.

FIG. 12 illustrates the internal construction of the audio processor 212.

As shown in the FIG., the audio processor 212 includes an echo canceler 1200 which cancels the audio data transmitted by the pertinent end itself, and a mixer 1210 which mixes the audio data to be transmitted anew.

The echo canceler 1200 includes an audio loop delay control 1201, audio variable delay device 1202, an audio subtracter 1203, an output control 1204, a linear → $\mu$/A converter 1205, a $\mu$/A→ linear converter 1206 and an audio level detector 1207. On the other hand, the mixer 1210 includes a $\mu$/A→ linear converter 1211, an audio adder 1212, a linear → $\mu$/A converter 1213 and an audio mean level discriminator 1214.

In the echo canceler 1200, the audio loop delay control 1201 is notified of a delay time taken since the transmission of the audio data till the return thereof to the pertinent end after having revolved around the loop, by the system controller 240, and it sets the delay time in the audio variable delay device 1202. As the delay time, a time period in which a specified transmitted H. 221 frame returns to the pertinent end after its revolution around the loop is measured in the MUX/DMUX 260, and it is reported to the system controller 240.

The $\mu$/A → linear converter 1211 converts audio data coded in accordance with the $\mu$/A rules by the audio codec 211, back into linear data, and it sends the linear data to the audio variable delay device 1202. The audio variable delay device 1202 delays the audio data delivered from the $\mu$/A → linear converter 1211, for the set time period, and it delivers the delayed data to the audio subtracter 1203.

On the other hand, the MUX/DMUX 260 extracts audio data from within the received H. 221 frame, and it sends the audio data to the $\mu$/A → linear converter 1206. This $\mu$/A → linear converter 1206 converts the audio data coded in accordance with the $\mu$/A rules and delivered from the MUX/DMUX 260, back into linear data, and it delivers the linear data to the audio subtracter 1203.

The audio subtracter 1203 subtracts the output audio data of the audio variable delay device 1202 from that of the $\mu$/A → linear converter 1206. Thus, the audio data transmitted by the pertinent end before is canceled from the received audio data.

The audio data after such cancellation is delivered to the linear → $\mu$/A converter 1205 through the output control 1204 and is coded in accordance with the $\mu$/A rules by the converter 1205, whereupon the coded data is sent to the audio codec 211. This audio codec 211 decodes the delivered audio data, and supplies the decoded data to the audio I/O device 210.

In addition, the audio data, which has been obtained in the way that the audio data transmitted by the pertinent end before is canceled from within the received audio data, is sent to the audio adder 1212 through the output control 1204. The audio adder 1212 adds up the audio data sent from the output control 1204 and audio data delivered from the μ/A → linear converter 1211. Thus, the audio data to be transmitted anew is mixed. Therefore, the linear → μ/A converter 1213 codes the resulting audio data in accordance with the μ/A rules and sends the μ/A-coded data to the MUX/DMUX 260. This MUX/DMUX 260 enters the sent audio data into the H. 221 frame, and transmits the resulting frame to the next end in the loop.

The audio mean level discriminator 1214 calculates the level of the audio data delivered from the m/A linear converter 1211, and sends the calculated level to the conference controller 220. The discriminated level of the audio data is used for the automatic change-over of the video data items to be displayed on the basis of the sound volumes of audio data items as stated before.

Further, the audio level detector 1207 operates when the pertinent end is the chairperson end. This detector 1207 notifies the conference controller 220 of the level of the audio data obtained in the way that the audio data transmitted by the pertinent end before is canceled from within the received audio data. Besides, the output control 1204 is a device for bringing the output value of the audio data of the echo canceler 1200 to zero once in compliance with an instruction from the conference controller 220. Incidentally, in this embodiment, the audio codec 211 is supposed to be a ready-made one which is interfaced with the data coded in accordance with the μ/A rules. However, in a case where the audio codec 211 is one interfaced with linear data, the μ/A → linear converter 1211 and the linear → μ/A converter 1205 are dispensed with.

Here, the details of the audio mean level discriminator 1214 will be explained.

Figure 13:
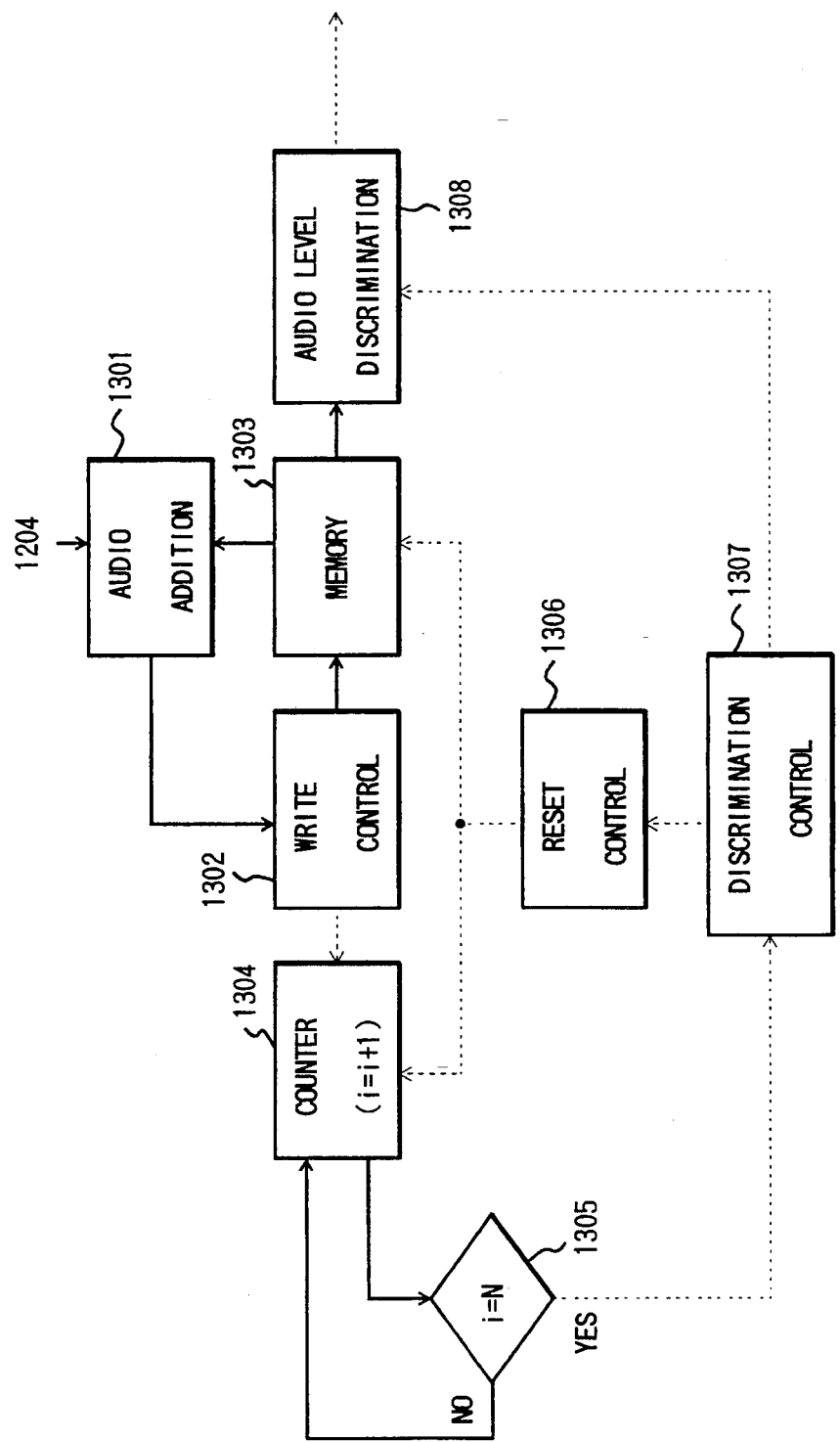
FIG. 13 is a block diagram showing the second example of construction of the video path controller in the embodiment.

FIG. 13 illustrates the internal construction of the audio mean level discriminator 1214.

As shown in the fIgure, the audio mean level discriminator 1214 includes an audio adder 1301, a write control 1302, a memory 1303, a counter 1304, a counter value comparator 1305, a reset control 1306, a discrimination control 1307 and an audio level discriminator 1308.

When supplied with the audio data from the μ/A → linear converter 1211, the audio adder 1301 reads out the value of the addition of the audio data items up to the last audio data, from the memory 1303, and it adds up the read-out value and the output audio data of the μ/A → linear converter 1211. Subsequently, it writes the audio data after the addition into the memory 1303 through the write control 1302. The number of times of writing into the memory 1303 is counted by the counter 1304.

When the number of times of writing into the memory 1303 is decided to have reached a predetermined number by the comparator 1305, the discrimination control 1307 notifies the audio level discriminator 1308 and the reset control 1306 of the decided situation. Upon the notification, the audio level discriminator 1308 reads out the addition value of the audio data stored till then, from the memory 1303, and it informs the conference controller 220 of the read-out value.

On the other hand, the reset control 1306 notified of the situation of the writing resets the content of the memory 1303 and the count value of the counter 1304.

In the above, the details of the multipoint teleconference system concerning the video data and the audio data have been explained.

Now, the details of the multipoint teleconference system will be explained in relation to controls required for holding and managing the multipoint teleconference.

In this embodiment, it is realized by exchanging control information among the chairperson end and the other ends to construct the multipoint teleconference system in which the ends are connected in the loop configuration as described before in conjunction with FIG. 1, to alter the construction of the multipoint teleconference system on account of any end leaving the multipoint teleconference, to designate video data to be presented as a display output in each end, and so forth.

First, the transmission frame of the control information will be explained.

In this embodiment, for the purpose of transmitting the control information, the area of the MLP data stipulated in CCITT Recommendation H. 221 is secured in the subchannel #8 (at numeral 602) of the H. 221 frame shown in FIG. 6, and a plurality of channels lying in this area are respectively assigned to the different ends. Thus, each end transmits the control information using the assigned channel.

Each of FIGS. 14(*a*) and 14(*b*) illustrates the channels in the MLP data area.

The MLP data area has a size of 6.4 kb/s or 4 kb/s, and it can be secured by a command in the BAS area (at numeral 601 in FIG. 6).

Shown in FIG. 14(*a*) is a case where the MLP data area is secured with the size of 6.4 kb/s. In this case, the eight channels of a common channel and channels Nos. 1~7 are defined in 8-bit unit in the MLP data area as seen from the FIG. Therefore, the common channel is used for the chairperson end, and the other channels are assigned to the other ends by the control information of the common channel.

Shown in FIG. 14(*b*) is a case where the MLP data area is secured with the size of 4 kb/s. In this case, the five channels of a common channel and channels Nos. 1~4 are defined in 8-bit unit in the MLP data area as seen from the FIG. Therefore, the common channel is used for the chairperson end, and the other channels are assigned to the other ends by the control information of the common channel.

Incidentally, the BAS area may well be employed for the transmission of the control information instead of the MLP data area.

More specifically, the BAS area 601 of the H. 221 frame shown in FIG. 6 may well be extended into the subchannel #8 (at numeral 602) by the command of the BAS area 601, so as to use the extended part of this area for transmitting the control information items of the individual ends.

The control information to be transmitted by each channel consists of a command and data.

Figure 15:
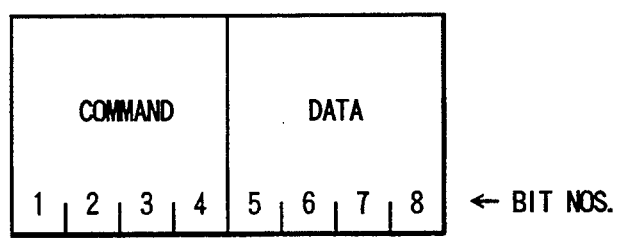
FIGS. 15(a) and 15(b) are explanatory diagrams showing schemes for transmitting commands and data in the embodiment.
Figure 15:
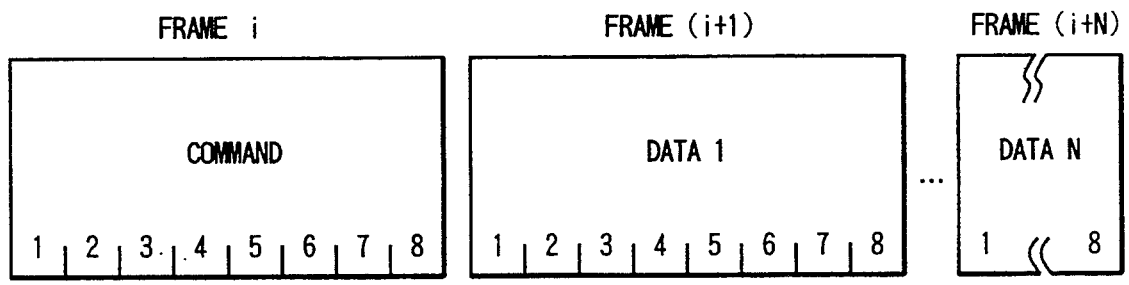

The command and the data to be transmitted may well be entered into the channel of the identical H. 221 frame as illustrated in FIG. 15(*a*). Alternatively, they may well be dividedly entered into the channels of the successive H. 221 frames as illustrated in FIG. 15(*b*).

With any of such transmitting schemes, each of the ends analyzes the MLP data area or BAS area of the received H. 221 frame. It extracts or cancels the control information transmitted by the pertinent end itself before and contained in the channel assigned thereto, and it relays the control information items in the other channels of the MLP data area or BAS area of the received H. 221 frame than the channel assigned to the pertinent end, to the next end in the loop without any change.

In the presence of new control information to be transmitted, each end enters the information into the channel assigned to the pertinent end itself, and it transmits the new control information to the next end in the loop, together with the control information items in the other channels of the MLP data area or BAS area of the received H. 221 frame than the channel assigned to the pertinent end.

The multipoint teleconference employing the control information items which are exchanged among the chairperson end and the other ends, proceed as detailed below.

The multipoint teleconference system employing the control information items is controlled principally by the system controllers 240 and conference controllers 220 of the respective ends.

First, the details of the system controller 240 and conference controller 220 of the chairperson end will be explained.

Figure 16:
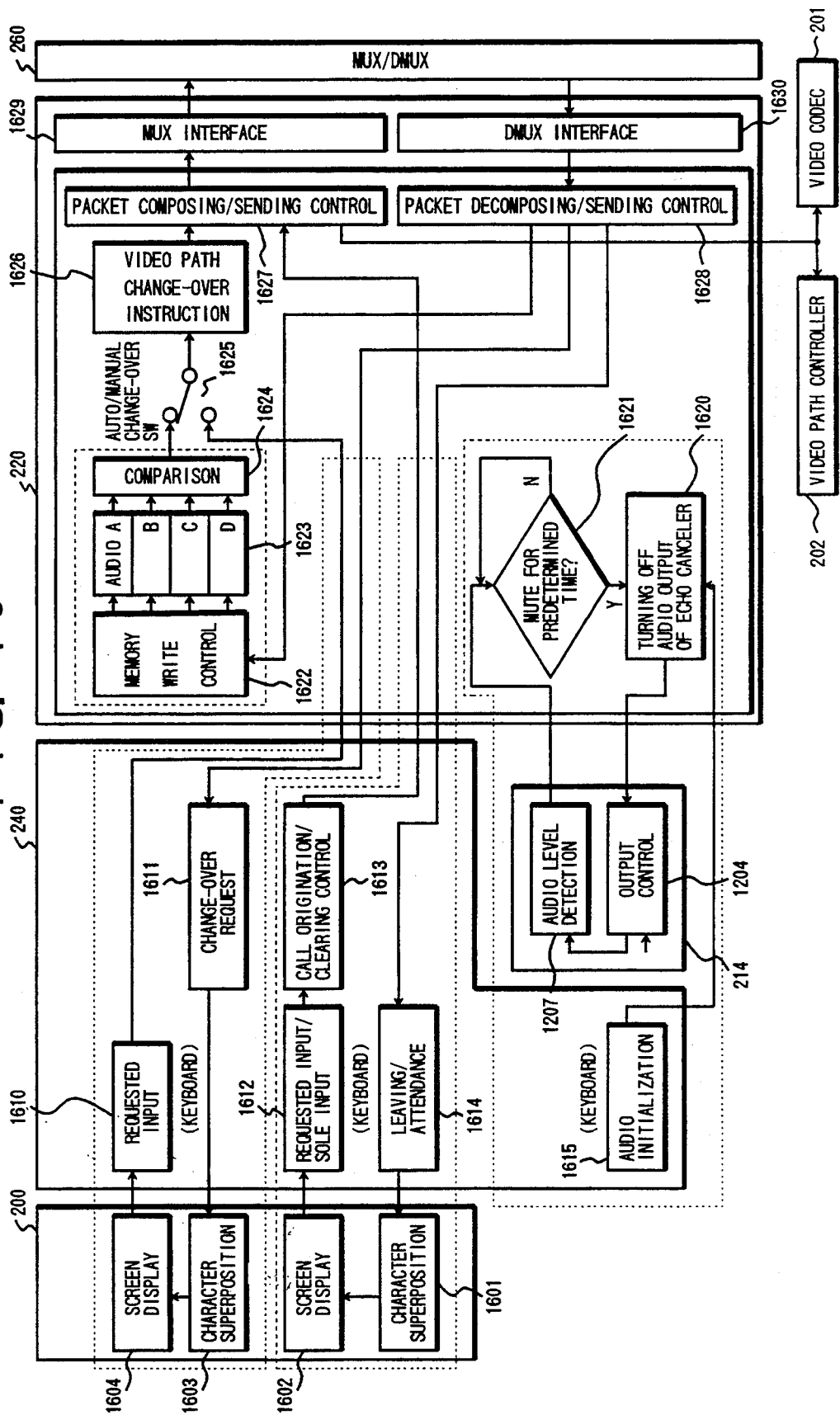
FIG. 16 is a block diagram showing the construction of the control system of the chairperson terminal in the embodiment.

FIG. 16 illustrates that control processing of the multipoint teleconference which is peculiar to the end serving as the chairperson. In this embodiment, each of the ends is endowed with functions for operating as the chairperson end.

The teleconference which utilizes the looped teleconference system shown in FIG. 1, is started as follows:

On this occasion, when the system controller 240 of the chairperson end A has the other conferee ends B, C and D designated from an unshown keyboard, it controls the end/network controller 250 so as to establish a call between the end A and the end B. Subsequently, a call origination/clearing process 1613 supplies a packet composing/sending control process 1627 with a command for instructing the called end B to connect with the end C. The packet composing/sending control process 1627 enters the supplied command into the common channel to generate MLP data or BAS data, which is subjected to an MUX interface process 1629 and is thereafter delivered to the MUX/DMUX 260. The MUX/DMUX 260 generates the H. 221 frame containing the delivered MLP data or BAS data, and the generated frame is transmitted to the end B through the network interface 270.

When the end B has connected with the end C, the system controller 240 of the chairperson end A transmits, to the end C, a command for instructing the end C to connect with the end D. The command is sent through the end B. Thereafter, when the end C has connected with the end D, the system controller 240 transmits a command, to the end D, for instructing the end D to connect with the end A. This command is sent through the ends B and C. When the ends A and D have connected, the looped system is entirely constructed.

In this manner, the ends to attend the teleconference are successively connected by the commands for instructing the connections with the adjacent ends, whereby the loop is formed up.

Next, the audio control in the multipoint teleconference will be explained.

The conference controller 220 decides whether or not the level reported by the audio level detector 1207 (refer to FIG. 12) of the audio processor 212 is a mute level for a predetermined time period, in other words, whether or not it is below the predetermined level judged to be mute, for the predetermined time period (1621). Herein, subject to the mute level for the predetermined time period, the conference controller 220 instructs the output control 1204 of the audio processor 212 to temporarily bring the audio data to "0", whereby the audio output of the echo canceler 1200 is temporarily turned OFF (1620).

When the audio data level is reset in this manner, calculation errors which develop in the audio subtracter 1203 and audio adder 1212 of the audio processor 212 are restrained from accumulating in the audio data. Incidentally, the accumulation of the calculation errors arises as noise in the case of outputting the audio data.

Next, the change-over control of video data to be displayed in the ends will be explained.

In this embodiment, the automatic mode based on the audio data levels of the individual ends or the manual mode based on a change-over request made by any of the ends can be selected for the change-over control of the video data. The selection is effected with an auto/-manual change-over switch 1625.

There will be explained the case where the video data items are automatically changed-over on the basis of the audio data levels of the ends.

The MUX/DMUX 260 delivers the MLP data or BAS data contained in the received H. 221 frame, to a packet decomposing/sending control process 1628 through a DMUX interface process 1630. The packet decomposing/sending control process 1628 decodes the delivered MLP data or BAS data, and supplies a memory write control 1622 with the data items of the audio mean levels sent from the individual ends. The memory write control 1622 writes the data items of the respective ends into a memory 1623, the levels are compared by a comparison process 1624, and a video path change-over instruction process 1626 is notified of the end which exhibits the highest audio data level. Subsequently, the video path change-over instruction process 1626 supplies the packet composing/sending control process 1627 with a command for turning the video data to-be-displayed into the video data of the end of the highest audio data level. The packet composing/sending control process 1627 generates MLP data or BAS data containing the command in the common channel, and the generated data is subjected to the MUX interface process 1629 and is delivered to the MUX/DMUX 260. Then, the MUX/DMUX 260 generates an H. 221 frame containing the delivered MLP data or BAS data, so as to transmit the frame to the ends in the loop through the network interface 270.

Next, there will be explained the case where the video data items to be presented as the display outputs in the ends are changed-over on the basis of the change-over request made by any of the ends.

Figure 17:
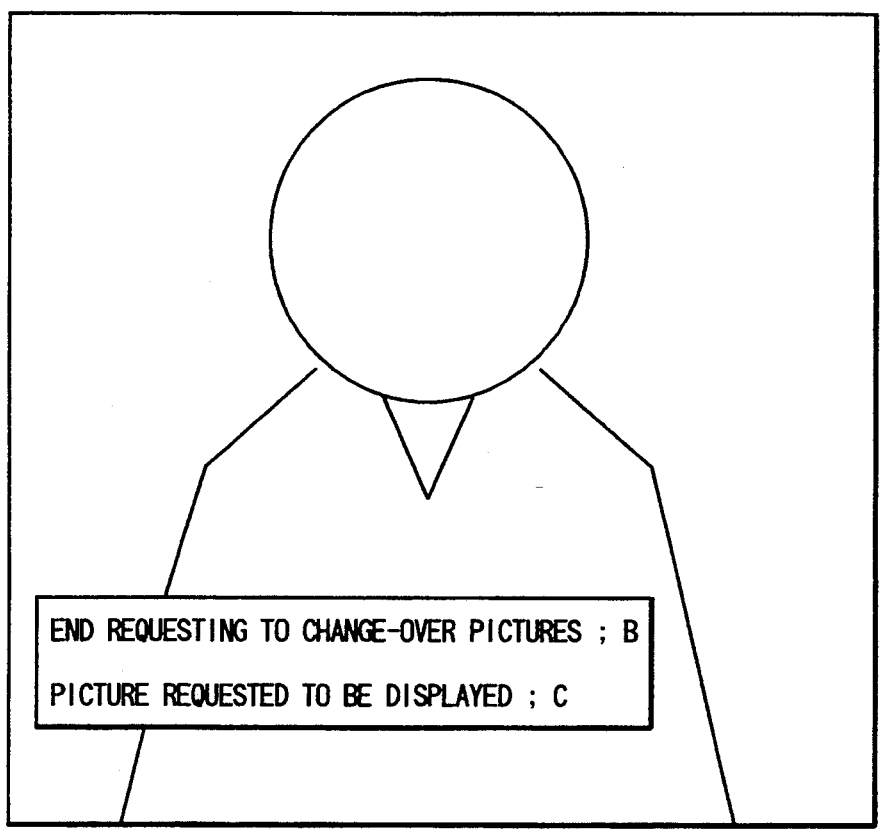
FIG. 17 is an explanatory diagram showing an example of display of the control information in the chairperson terminal.

The MUX/DMUX 260 delivers the MLP data or BAS data contained in the received H. 221 frame, to the packet decomposing/sending control process 1628 through the DMUX interface process 1630. The packet decomposing/sending control process 1628 decodes the delivered MLP data or BAS data, and supplies a change-over request process 1611 with a change-over request command if this command is contained. When the change-over request process 1611 is supplied with the command indicative of the change-over request, or when an instruction for the change-over request is given from the keyboard, the content of the change-over request is delivered to a character superposition process 1603. Then, the character superposition process 1603 produces characters to-be-superposed and delivers them to a screen display process 1604, which presents the content of the change-over request in superposition on the display output picture of the video I/O device 200 as shown in FIG. 17.

Subsequently, a request input process 1610 notifies the video path change-over instruction process 1626 of the end which is transmitting the video data requested to be displayed by the change-over request. The video path change-over instruction process 1626 supplies the packet composing/sending control process 1627 with a command for turning the video data to-be-displayed into the video data of the aforementioned end. The packet composing/sending control process 1627 generates MLP data or BAS data containing the command in the common channel, and the generated data is subjected to the MUX interface process 1629 and is delivered to the MUX/DMUX 260. Then, the MUX/DMUX 260 generates an H. 221 frame containing the delivered MLP data or BAS data, so as to transmit the frame to the ends in the loop through the network interface 270.

Next, there will be explained a case where any of the ends leaves the teleconference utilizing the looped teleconference system shown in FIG. 1, in the course of this teleconference, or a case where a new end attends the teleconference midway.

Figure 18:
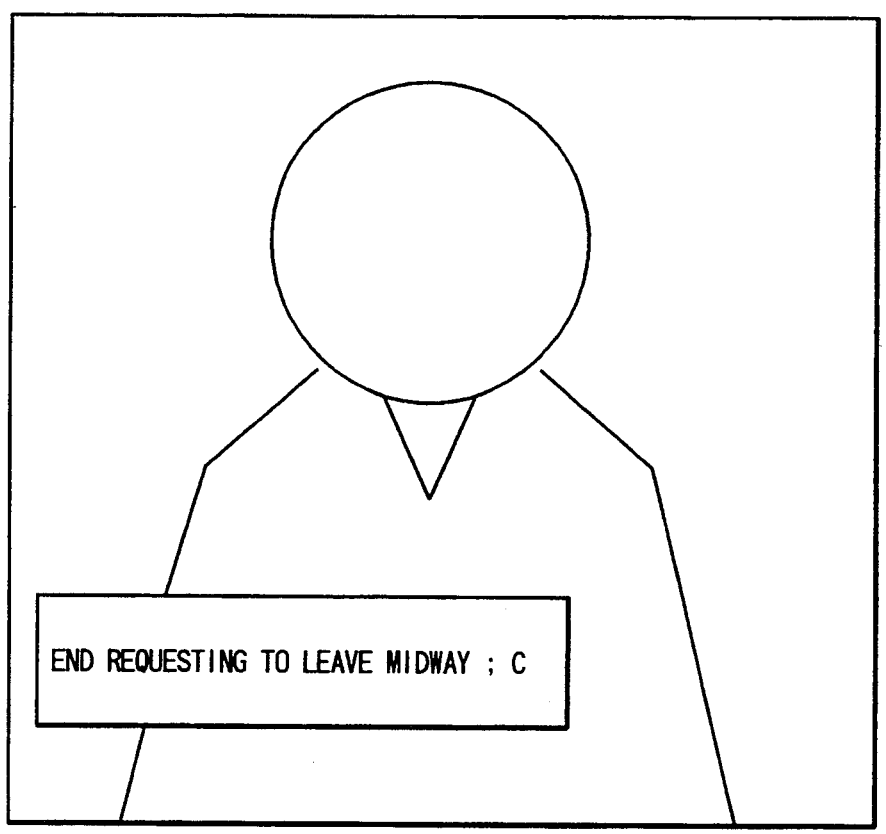
FIG. 18 is an explanatory diagram showing another example of display of the control information in the chairperson terminal.

The MUX/DMUX 260 delivers the MLP data or BAS data contained in the received H. 221 frame, to the packet decomposing/sending control process 1628 through the DMUX interface process 1630. The packet decomposing/sending control process 1628 decodes the delivered MLP data or BAS data, and supplies a leaving/attendance process 1614 with a leaving request command if this command is contained. When the leaving/attendance process 1614 is supplied with the leaving request command, or when an instruction for a leaving request or an attendance request is given from the keyboard, the content of the request is delivered to a character superposition process 1601. Then, the character superposition process 1601 produces characters to-be-superposed and delivers them to a screen display process 1602, which presents the content of the request in superposition on the display output picture of the video I/O device 200 as shown in FIG. 18.

Subsequently, a request input/sole input process 1612 notifies the call origination/clearing control process 1613 of the content of the request. The call origination/clearing control process 1613 generates clearing commands and call origination commands in dependence on the content of the request, and delivers them to the packet composing/sending control process 1627. The clearing command instructs the two ends which are each adjoining the end which is leaving in the loop to cut off their connections with the leaving end, or it instructs the end to attend to disconnect the two ends connected in the loop and lying near it. On the other hand, the call origination command instructs the connection between the ends which previously connected with the end having just left, or it instructs the formation of a loop which includes the end to attend. More specifically, in a case where the end C in FIG. 1 requests to leave the teleconference, the disconnection between the ends C and D is instructed by the clearing command, the disconnection between the ends C and B is instructed by the clearing command, and the connection of the end B with the end D is instructed by the call origination command. Further, in a case where the end E to attend the teleconference anew is inserted between the ends B and C in FIG. 1, the disconnection between the ends B and C is instructed by the clearing command, the connection of the end B with the end E is instructed by the call origination command, and the connection of the end E with the end C is instructed by the call origination command after the end E has connected with the end B.

The packet composing/sending control process 1627 generates MLP data or BAS data in which the command delivered from the call origination/clearing control process 1613 is contained in the common channel. The generated data is subjected to the MUX interface process 1629 and is delivered to the MUX/DMUX 260. Then, the MUX/DMUX 260 generates an H. 221 frame containing the delivered MLP data or BAS data, so as to transmit the frame to the ends in the loop through the network interface 270.

Next, there will be explained the control processing of the multipoint teleconference by the end which is not the chairperson end.

Figure 19:
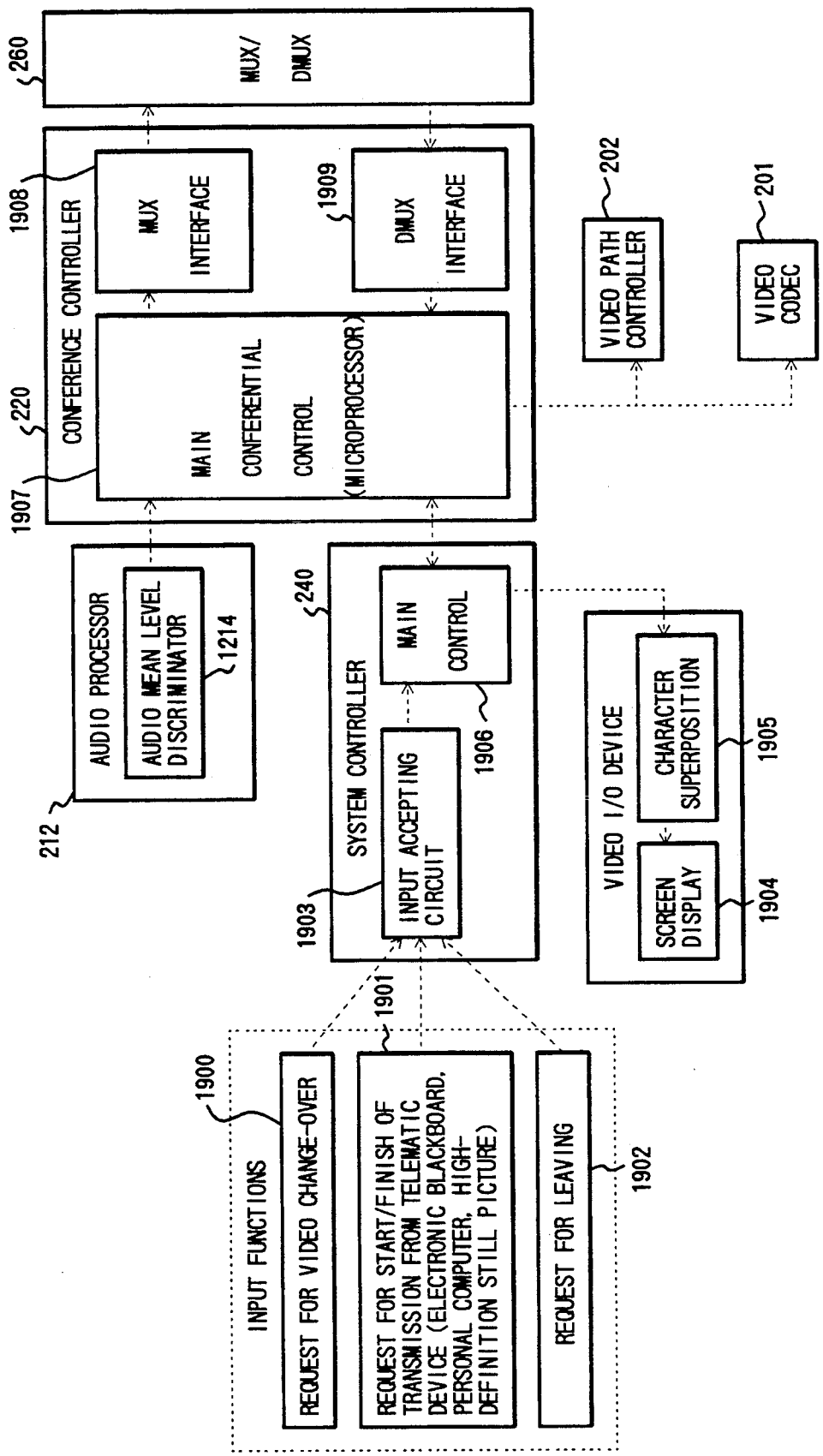
FIG. 19 is a block diagram showing the construction of the control system of the terminal other than the chairperson terminal, in the embodiment.

FIG. 19 illustrates the control processing of the multipoint teleconference by the end other than the chairperson end.

First, let's consider a case where the pertinent end has been instructed by the chairperson end to connect with or disconnect from any other end.

The MUX/DMUX 260 delivers the MLP data or BAS data contained in the received H. 221 frame, to an unshown packet decomposing/sending control process through a DMUX interface process 1909. The packet decomposing/sending control process decodes the delivered MLP data or BAS data, and supplies the system controller 240 with a call origination command or a clearing command if this command is contained in the common channel (refer to FIGS. 14(*a*) and 14(*b*)). The system controller 240 controls the end/network controller 250 so as to connect or disconnect the pertinent end with or from the end designated by the command.

Secondly, let's consider a case where the pertinent end has been instructed by the chairperson end to change-over video data to-be-displayed.

The MUX/DMUX 260 delivers the MLP data or BAS data contained in the received H. 221 frame, to the unshown packet decomposing/sending control process through the DMUX interface process 1909. The packet decomposing/sending control process decodes the delivered MLP data or BAS data, and supplies the main conferential control process 1907 of the conference controller 220 with a command instructive of the change-over of the video data to-be-displayed if this command is contained in the common channel.

In accordance with the content of the supplied command, the main conferential control process 1907 of the conference controller 220 determines if the video data of the pertinent end is to be entered into the H. 261 frame which is to be transmitted from this end. In case of transmitting the H. 261 frame which contains the video data of the pertinent end, the main conferential control process 1907 determines the size of video information to be sent by the pertinent end and the GOB's to contain the video data. Further, the control process 1907 notifies the video codec 201 and the video path controller 202 of the determined contents. As stated before, the video codec 201 and the video path controller 202 operate on the basis of the notification.

Next, there will be explained processing for transmitting the audio mean level to the chairperson end.

When the main conferential control process 1907 of the conference controller 220 is notified of the audio mean level by the audio mean level discriminator 1214 of the audio processor 212 as stated before, it delivers the data of the level to an unshown packet composing-/sending control process. The packet composing/sending control process generates MLP data or BAS data containing the data in the channel assigned to the pertinent end, and the generated data is subjected to an MUX interface process 1908 and is delivered to the MUX/DMUX 260. Then, the MUX/DMUX 260 generates an H. 221 frame containing the delivered MLP data or BAS data, so as to transmit the frame to the chairperson end in the loop through the network interface 270.

Next, there will be explained processing by which the request for changing-over the video data, the request for leaving the teleconference midway or a request for transmitting telematic end data is transmitted to the chairperson end.

When such a request is input to the pertinent end from the keyboard or the like not shown, the input accepting process 1903 of the system controller 240 accepts the request and delivers it to the main control 1906 thereof. The main control 1906 generates a command conforming to the delivered request, and delivers the command to the main conferential control process 1907. This control process 1907 delivers the command to the packet composing/sending control process not shown. The packet composing/sending control process generates MLP data or BAS data containing the command in the channel assigned to the pertinent end, and the generated data is subjected to the MUX interface process 1908 and is delivered to the MUX/DMUX 260. Then, the MUX/DMUX 260 generates an H. 221 frame containing the delivered MLP data or BAS data, so as to transmit the frame to the chairperson end in the loop through the network interface 270.

Incidentally, a character superposition process 1905 superposes the command, the data etc. received from the chairperson end, on the display of the screen of the video I/O device 200 (a screen display process 1904) under the control of the main control 1906.

Meanwhile, the above embodiment has mentioned the expedient (FIGS. 7(a)~7(d)) in which the video data items transmitted by the four ends are contained in the H. 261 frame.

The video codec 201 of each end decodes the video data contained in the received H. 261 frame, and presents the display output on the video I/O device 200.

In this regard, in the case where the video data items transmitted by the four ends are contained in the H. 261 frame, they are independent of one another. Therefore, the video codec 201 can treat the video data items transmitted by the respective ends, independently of one another.

In this embodiment, accordingly, the video codec 201 of each end presents the decoded video data as the display output when the decoding of the video data transmitted by the individual end has finished.

Figure 20:
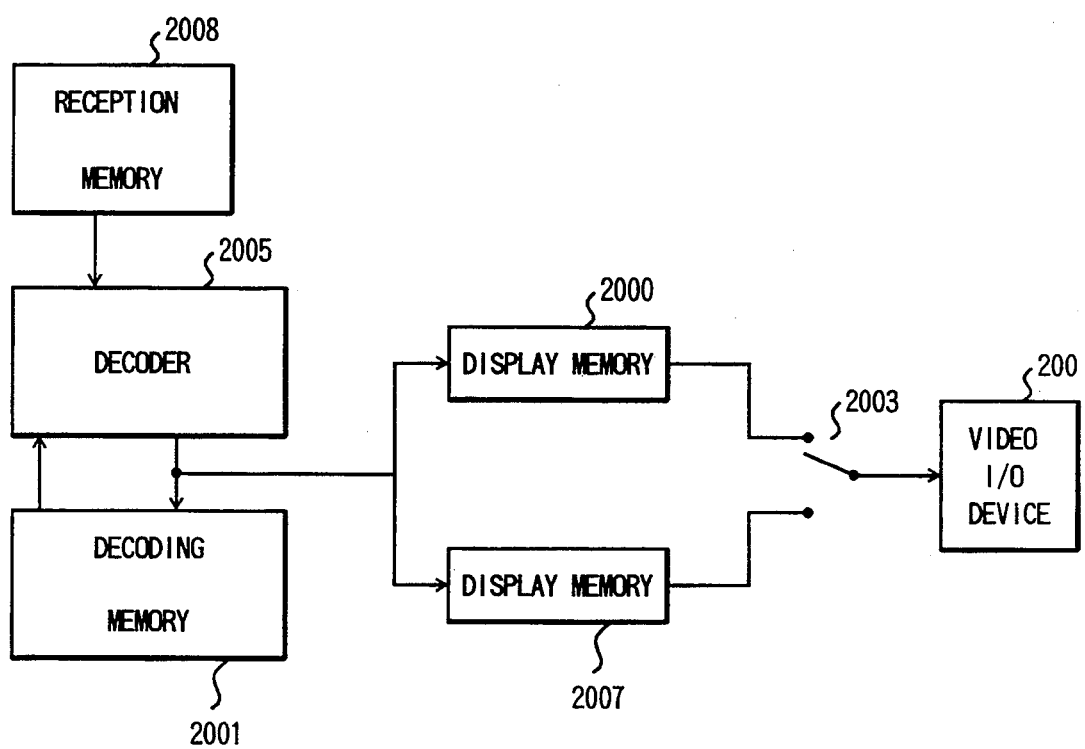
FIG. 20 is a block diagram showing the first example of arrangement of a video decoder and peripheral constituents in the embodiment.

FIG. 20 illustrates the arrangement of the video decoder and peripheral constituents in the video codec 201.

Referring to the FIG., numeral 2005 indicates the decoder, numeral 2001 a decoding memory, numerals 2000 and 2007 a display memory of double buffer construction, and numeral 2008 a reception memory. The video I/O device 200 is connected with the buffer of the display memory through a switch 2003. When one of the buffers 2000 and 2007 operates for writing decoded data, the other operates for reading out data to be displayed by the video I/O device 200.

The decoder 2005 reads out received video data from the reception memory 2008, and decodes it by reference to the decoded data of the last frame stored in the decoding memory 2001. The decoded data is written into the decoding memory 2001 so as to be referred to in the operation of decoding the next frame, and it is also written into the buffer 2000 of the display memory currently operating for writing the decoded data. When the video data corresponding to $\frac{1}{4}$ picture area as transmitted by one end has been decoded, the buffers 2000 and 2007 are changed-over so as to use the former for reading out the data to-be-displayed and to use the latter for writing the decoded data.

In this regard, a single memory can be shared for the display memory and the decoding memory.

Figure 21:
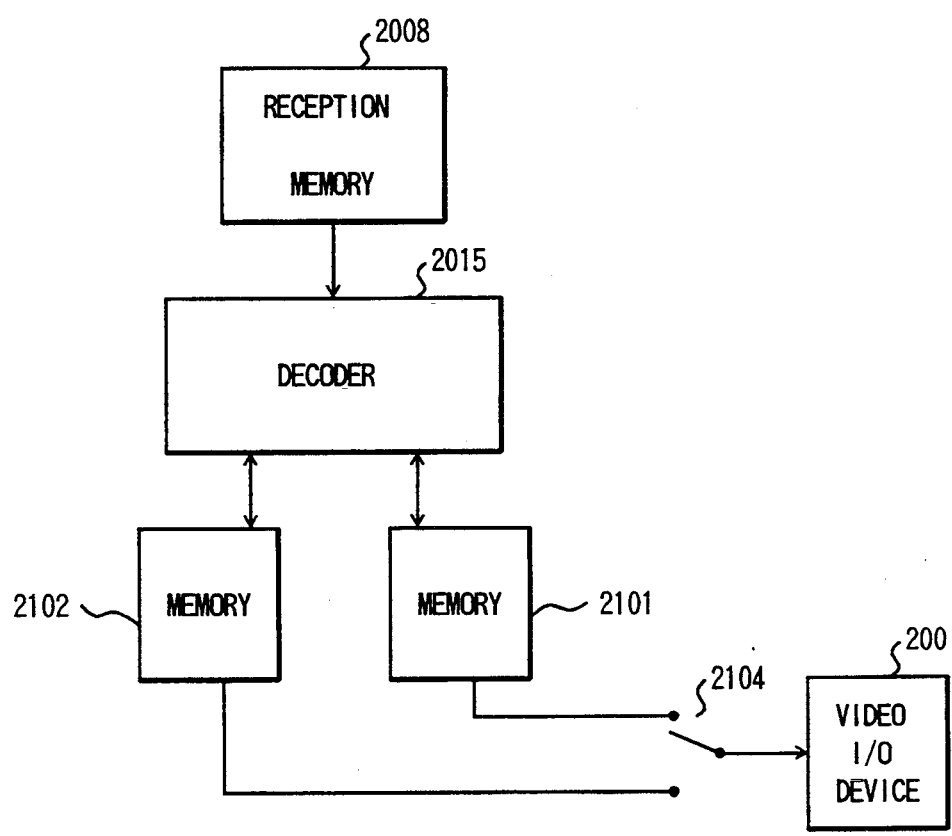
FIG. 21 is a block diagram showing the second example of arrangement of the video decoder and peripheral constituents in the embodiment.

FIG. 21 illustrates an arrangement in the case of using the single memory for both the display memory and the decoding memory.

Referring to the figure, numeral 2105 indicates a decoder, numerals 2101 and 2102 a memory of double buffer construction which is used as both the decoding memory and the display memory, and numeral 2008 a reception memory. The video I/O device 200 is connected with the decoding/display memory through a switch 2104. When one of the buffers 2101 and 2102 of the decoding/display memory operates as the decoding memory for reading out reference data and the display memory for reading out data to-be-displayed, the other buffer operates as the decoding memory for writing decoded data and the display memory.

The decoder 2105 reads out received video data from the reception memory 2008, and decodes it by reference to the decoded data of the last frame read out of the buffer 2101 which is operating as the decoding memory for reading out the reference data. In parallel with the operation of reading out the reference data from the buffer 2101, the decoded data of the buffer 2101 is read out for display and is sent to the video I/O device 200. The data decoded by the decoder 2105 is written into the buffer 2102 operating as the decoding memory for writing the decoded data, so as to be referred to in the operation of decoding the next frame. When the video data corresponding to $\frac{1}{4}$ picture area as transmitted by one end has been decoded, the decoded data of an area other than the $\frac{1}{4}$ area having been processed this time is transferred to the buffer 2102 from the buffer 2101 operating as the decoding memory for reading out the reference data, and the roles of the buffers 2101 and 2102 are changed-over.

Thenceforth, likewise to the above, each time the video data corresponding to $\frac{1}{4}$ picture area as transmitted by one end has been decoded, it is transferred to the buffer 2102, and the roles of the buffers 2101 and 2102 are changed-over.

In the foregoing embodiment, the looped multipoint teleconference system is constructed in such a way that the pertinent end is connected with each of the adjacent ends by the single B channel as illustrated in FIG. 1.

Since, however, the single B channel consists of two transfer paths of opposite transmitting directions, two looped communication channels are actually formed in the case of connecting the pertinent end with each of the adjacent ends by the single B channel. In the above, there has been described the case where only one of the two looped communication channels is used. In this regard, the communication capacity among the ends can be increased by simultaneously using the two looped communication channels. By way of example, video data and audio data can be distributed to the two looped communication channels in such a manner that the former is transmitted by the H. 221 frame of one of these communication channels, while the latter is transmitted by the H. 221 frame of the other communication channel.

Moreover, in this case, the H. 221 frame can be extended by utilizing an H. 221 frame shown in FIG. 22 as employs the additional channel stipulated in the CCITT Recommendation H. 221. That is, one of the two looped communication channels is used as the "first channel" in the Recommendation H. 221, while the other communication channel is used as the "additional channel" in the same.

The looped multipoint teleconference system of the foregoing embodiment is constructed by connecting the pertinent end with each of the adjacent ends by the single B channel as illustrated in FIG. 1. Since, however, the single B channel consists of the two transfer paths of the opposite transmitting directions as stated before, even an architecture shown in FIG. 23 in which the pertinent end is connected with the succeeding end by the single B channel can form looped communication channels. More specifically, the ends or terminals 1 and 2 lying at both the extremities of the system architecture fold back and transmit H. 221 frames. The ends or terminals 3 and 4 not lying at the extremities transmit received H. 221 frames to the next ends in penetrating fashion in either transmitting direction. The present invention is similarly applicable to the case of forming the looped communication channels in this manner.

In the above embodiments, the ISDN stipulated in the CCITT Recommendations I-series is assumed as the digital communications network 5 shown in FIG. 1, and each end is assumed to be connected with the ISDN by the fundamental interface of 2B+D.

However, the present invention is not restricted to the connection with the ISDN by the fundamental interface of 2B+D, but it is similarly applicable to a case where each end is connected with the ISDN by a first-order group velocity interface. Besides, when a plurality of B channels within the first-order group velocity interface is employed in this case, the H. 221 employing the additional channel can be used.

As set forth above, according to the present invention, it is possible to provide a multipoint teleconference system in which a multipoint teleconference can be realized by only conferee ends without requiring an MCU.

What is claimed is:

1. In a multipoint video telephone/teleconference system having a plurality of video telephone/teleconference terminals which are connected to digital communication channels and which transmit and receive communication frame containing video telephonic/teleconferential data, which includes video data, through the connected digital communication channels, said multipoint teleconference system comprising:
wherein said digital communication channels connect said plurality of video telephone/teleconference terminals in a ring configuration; and
wherein each of said video telephone/teleconference terminals comprises:
generation means for generating the video telephonic/teleconferential data which is to be sent to the other video telephone/teleconference terminals, said telephonic/teleconferential data including said video data,
resumption means for resuming said video data contained in said communication frame received from the video telephone/teleconference terminal at an upper stream position of a loop with respect to transfer of said communication frame,
relay means for transmitting the received communication frame to the video telephone/teleconference terminal at a lower stream position of said loop so that said communication frame may revolve around said loop, said loop being formed of said digital communication channels which connect said plurality of video telephone/teleconference terminals to one another,
cancellation means for cancelling the video data which was entered into said communication frame by a video telephone/teleconference terminal itself and which has revolved around said loop, from within said communication frame which is to be relayed by said relay means, and
transmission means for entering the generated video data into an unused area of said communication frame which is to be relayed by said relay means, thereby sending said generated video data to said other video telephone/teleconference terminals which lie on said loop.

2. In a multipoint teleconference system having an ISDN which transfers a communication frame around a set channel, and a plurality of video telephone/teleconference terminals which conform to CCITT Recommendation H.320 and which are connected to the ISDN, said multipoint teleconference system comprising:
wherein said communication frame contains video telephonic/teleconferential data including video data;
wherein at least one of said plurality of video telephone/teleconference terminals comprises:
channel setting means for setting channels between the adjacent video telephone/teleconference terminals in said ISDN so that said plurality of video telephone/teleconference terminals may be connected in a ring configuration; and
wherein each of said video telephone/teleconference terminals comprises:
generation means for generating said video telephonic/teleconferential data which is to be sent to the other video telephone/teleconference terminals, said telephonic/teleconferential data including the video data,
resumption means for resuming said video data contained in the frame received from the video telephone/teleconference terminal at an upper stream position of a loop with respect to transfer of said communication frame,
relay means for relaying the received communication frame to the video telephone/teleconference terminal at a lower stream position of said loop so that said communication frame may revolve around said loop, said loop being formed of said plurality of video telephone/teleconference terminals and said channels set by said channel setting means so as to connect said video telephone/teleconference terminals,
cancellation means for canceling the video telephonic/teleconferential data which was entered into said communication frame by a video telephone/teleconference terminal itself and which has revolved around said loop, from within said communication frame which is to be relayed by said relay means, and transmission means for entering the generated video data into an unused area of said communication frame which is to be relayed by said relay means, thereby transferring said generated video data to said other video telephone/teleconference terminals which lie on said loop.

3. A multipoint teleconference system as defined in claim 2, wherein:

said communication frame is a frame stipulated in CCITT Recommendation H. 221 (hereinbelow, termed "H. 221 frame"), a frame stipulated in CCITT Recommendation H. 261 (herein below, termed "H. 261 frame") is prepared in said H. 221 frame, and groups of blocks (GOB's) included in said H. 261 frame are respectively allotted to the individual video telephone/teleconference terminals, said GOB's each being a plurality of blocks into which the data area for H. 261 frames are divided;

said resumption means resumes said video data contained in the plurality of GOB's of said H. 261 frame prepared in the received H. 221 frame, into a picture of one picture frame so as to present a display output;

said cancellation means cancels video data which was entered into said H. 261 frame by said transmission means of said video telephone/teleconference terminal itself and which has revolved around said loop, from at least one GOB allotted to said video telephone/teleconference terminal itself; and said transmission means enters the generated video data into at least one GOB allotted to said video telephone/teleconference terminal itself, among said GOB's of said H. 261 frame prepared in said H. 221 frame.

4. A multipoint teleconference system as defined in claim 3, wherein:

said plurality of GOB's included in said H. 261 frame are divided into N (being a natural number) groups, which are respectively allotted to the N video telephone/teleconference terminals; and said resumption means of each of said video telephone/teleconference terminals resumes the video data contained in said H. 261 frame, in respective areas of one picture frame corresponding to the GOB's having contained said video data, so as to present display output.

5. A multipoint teleconference system as defined in claim 2, wherein:

said communication frame is a frame stipulated in CCITT Recommendation H. 221 (hereinbelow, termed "H. 221 frame"), and a frame stipulated in CCITT Recommendation H. 261 (herein below, termed "H. 261 frame") is prepared in said H. 221 frame;

said each video telephone/teleconference terminal further comprises audio data resumption means for resuming audio data into speech so as to emit the speech;

said generation means generates the video telephonic/teleconferential data including audio data;

said cancellation means cancels an audio data component which was entered into said H. 261 frame by said transmission means of said video telephone/teleconference terminal itself and which has revolved around said loop, from audio data contained in said H. 261 frame of the received H. 221 frame;

said audio data resumption means resumes the audio data with said audio data component of said terminal itself cancelled by said cancellation means, into the speech so as to emit said speech; and said transmission means enters new audio data into said H. 261 frame of the H. 221 frame to be relayed by said relay means, instead of said audio data contained in said H. 261 frame of said H. 221 frame received by said relay means, said new audio data being obtained in such a way that said audio data generated by said generation means is added to said audio data, with said audio data component of said terminal itself cancelled by said cancellation means.

6. In a multipoint teleconference system having an ISDN which transfers a communication frame around a set channel, and a plurality of video telephone/teleconference terminals which conform to CCITT Recommendation H.320 and which are connected to the ISDN, said multipoint teleconference system comprising;

wherein at least one of said plurality of video telephone/teleconference terminals comprises:

channel setting means for setting channels between the adjacent video telephone/teleconference terminals in the ISDN so that said plurality of video telephone/teleconference terminals may be connected in a ring configuration;

wherein each of said video telephone/teleconference terminals comprises:

generation means for generating said video telephonic/teleconferential data which is to be sent to the other video telephone/teleconference terminals, relay means for relaying the communication frame received from the video telephone/teleconference terminal at an upper stream position of a loop to the video telephone/teleconference terminal at a lower stream position of said loop so that said communication frame may revolve around said loop, said loop being formed of said plurality of video telephone/teleconference terminals and said channels set by said channel setting means so as to connect said video telephone/teleconference terminals, transmission means for entering the generated video telephonic/teleconferential data into said communication frame which is to be relayed by said relay means, thereby transferring said generated video telephonic/teleconferential data to said other video telephone/teleconference terminals which lie on said loop, and cancellation means for canceling the video telephonic/teleconferential data which was entered into said communication frame by said transmission means of a video telephone/teleconference terminal itself before and which has revolved around said loop, from within said communication frame which is to be relayed by said relay means;

wherein said communication frame is a frame stipulated in CCITT Recommendation H. 221 (hereinbelow, termed "H. 221 frame"), a frame stipulated in CCITT Recommendation H. 261 (herein below, termed "H. 261 frame") is prepared in said H. 221 frame, and groups of blocks (GOB's) included in said H. 261 frame are respectively allotted to the individual video telephone/teleconference terminals, said GOB's each being a plurality of blocks into which the data area for H. 261 frames are divided;

wherein each of said video telephone/teleconference terminals further comprises resumption means for resuming video data contained in the plurality of GOB's of said H. 261 frame prepared in the received H. 221 frame, into a picture of one picture frame so as to present a display output;

wherein said cancellation means cancels video data which was entered into said H. 261 frame by said transmission means of said video telephone/teleconference terminal itself and which has revolved around said loop, from at least one GOB allotted to said video telephone/teleconference terminal itself; and wherein said transmission means enters the generated video data into at least one GOB allotted to said video telephone/teleconference terminal itself, among said GOB's of said H. 261 frame prepared in said H. 221 frame.

7. A multipoint teleconference system as defined in claim 6, wherein:

wherein said plurality of GOB's included in said H. 261 frame are divided into N (being a natural number) groups, which are respectively allotted to the N video telephone/teleconference terminals; and wherein said resumption means of each of said video telephone/teleconference terminals resumes the video data contained in said H. 261 frame, in respective areas of one picture frame corresponding to the GOB's having contained said video data, so as to present said display output.

8. In a multipoint teleconference system having an ISDN which transfers a communication frame around a set channel, and a plurality of video telephone/teleconference terminals which conform to CCITT Recommendation H.320 and which are connected to the ISDN, said multipoint teleconference system comprising:

wherein at least one of said plurality of video telephone/teleconference terminals comprises:

channel setting means for setting channels between the adjacent video telephone/teleconference terminals in the ISDN so that said plurality of video telephone/teleconference terminals may be connected in a ring configurations;

wherein each of said video telephone/teleconference terminals comprises:

generation means for generating said video telephonic/teleconferential data which is to be sent to the other video telephone/teleconference terminals, relay means for relaying the communication frame received from the video telephone/teleconference terminal at an upper stream position of a loop to the video telephone/teleconference terminal at a lower stream position of said loop so that said communication frame may revolve around said loop, said loop being formed of said plurality of video telephone/teleconference terminals and said channels set by said channel setting means so as to connect said video telephone/teleconference terminals, transmission means for entering the generated video telephonic/teleconferential data into said communication frame which is to be relayed by said relay means, thereby transferring said generated video telephonic/teleconferential data to said other video telephone/teleconference terminals which lie on said loop, and cancellation means for canceling the video telephonic/teleconferential data which was entered into said communication frame by said transmission means of a video telephone/teleconference terminal itself before and which has revolved around said loop, from within said communication frame which is to be relayed by said relay means;

wherein said communication frame is a frame stipulated in CCITT Recommendation H. 221 (hereinbelow, termed "H. 221 frame"), and a frame stipulated in CCITT Recommendation H. 261 (herein below, termed "H. 261 frame") is prepared in said H. 221 frame;

wherein each of said video telephone/teleconference terminals further comprises audio data resumption means for resuming audio data into speech so as to emit the speech;

wherein said generation means generates the video telephonic/teleconferential data including audio data;

wherein said cancellation means cancels an audio data component which was entered into said H. 261 frame by said transmission means of said video telephone/teleconference terminal itself and which has revolved around said loop, from audio data contained in said H. 261 frame of the received H. 221 frame;

wherein said audio data resumption means resumes the audio data with said audio data component of said terminal itself cancelled by said cancellation means, into the speech so as to emit said speech; and wherein said transmission means enters new audio data into said H. 261 frame of the H. 221 frame to be relayed by said relay means, instead of said audio data contained in said H. 261 frame of said H. 221 frame received by said relay means, said new audio data being obtained in such a way that said audio data generated by said generation means is added to said audio data with said audio data component of said terminal itself cancelled by said cancellation means.

9. A video telephone/teleconference terminal connectable with a plurality of digital communication channels, comprising:

generation means for generating video telephonic/teleconferential data which is to be sent to a plurality of other video telephone/teleconference terminals, said telephonic/teleconferential data including video data;

resumption means for resuming said video data contained in a communication frame received from any of a plurality of set channels;

relay means for relaying the received communication frame to another of said set channels;

cancellation means for cancelling the video data which was entered into said communication frame by said video telephone/teleconference terminal itself before the reception of said communication frame, from within said communication frame which is to be relayed by said relay means; and transmission means for entering the generated video data into an unused area of said communication frame which is to be relayed by said relay means.

10. A video telephone/teleconference terminal connectible with an ISDN, comprising:
   channel setting means for setting a plurality of channels between said video telephone/teleconference terminal itself and a plurality of other video telephone/teleconference terminals in the ISDN;
   generation means for generating video telephonic/teleconferential data which is to be sent to the other video telephone/teleconference terminals, said telephonic/teleconferential data including video data;
   resumption means for resuming said video data contained in a communication frame received from any of the set channels;
   relay means for relaying the received communication frame to another of the set channels;
   cancellation means for canceling the video telephonic/teleconferential data which was entered into said communication frame by said video telephone/teleconference terminal itself before the reception of said communication frame, from within said communication frame which is to be relayed by said relay means; and
   transmission means for entering the generated video data into an unused area of said communication frame which is to be relayed by said relay means.

11. A video telephone/teleconference terminal as defined in claim 10, wherein:
   said communication frame is a frame stipulated in CCITT Recommendation H. 221 (hereinbelow, termed "H. 221 frame");
   said resumption means resumes said video data into a picture of one picture frame so as to present a display output, said video data being contained in a plurality of groups of blocks (GOB's) of a frame stipulated in CCITT Recommendation H. 261 (hereinbelow, termed "H. 261 frame") and prepared in the received H. 221 frame, said GOB's each being a plurality of blocks into which the data area for H. 261 frames are divided;
   said transmission means enters the generated video data into at least one GOB allotted to said video telephone/teleconference terminal itself, among said plurality of GOB's of said H. 261 frame prepared in said H. 221 frame; and
   said cancellation means cancels video data which was entered into said H. 261 frame by, said transmission means of said video telephone/teleconference terminal itself before the reception of said H. 221 frame to be relayed, from at least one GOB allotted to said video telephone/teleconference terminal itself.

12. A video telephone/teleconference terminal as defined in claim 10, wherein:
   said communication frame is a frame stipulated n CCITT Recommendation H. 221 (hereinbelow, termed "H. 221 frame"), and a frame stipulated in CCITT Recommendation H. 261 (hereinbelow, termed "H. 261 frame") is prepared in said H. 221 frame;
   said video telephone/teleconference terminal comprises audio data resumption means for resuming audio data into speech so as to emit the speech;
   said generation means generates the video telephonic/teleconferential data including audio data;
   said cancellation means cancels an audio data component which was entered into said H. 261 frame by said transmission means of said video telephone/teleconference terminal itself before the reception of said H. 221 frame, from audio data contained in said H. 261 frame of the received H. 221 frame;
   said audio data resumption means resumes the audio data with said audio data component of said terminal itself cancelled by said cancellation means, into speech so as to emit said speech; and
   said transmission means enters new audio data into said H. 261 frame to be relayed by said relay means, instead of said audio data contained in said H. 261 frame of said H. 221 frame received by said relay means, said new audio data being obtained in such a way that said audio data generated by said generation means is added to said audio data with said audio data component of said terminal itself canceled by said cancellation means.

13. A video telephone/teleconference terminal connectible with an ISDN, comprising:
   channel setting means for setting a plurality of channels between said video telephone/teleconference terminal itself and a plurality of other video telephone/teleconference terminals in the ISDN;
   generation means for generating video telephonic/teleconferential data which is to be sent to the other video telephone/teleconference terminals;
   relay means for relaying a communication frame received from any of the set channels to another of the set channels;
   transmission means for entering the generated video telephonic/teleconferential data into said communication frame which is to be relayed by said relay means; and
   cancellation means for canceling the video telephonic/teleconferential data which was entered into said communication frame by said transmission means of said video telephone/teleconference terminal itself before the reception of said communication frame, from within said communication frame which is to be relayed by said relay means;
   wherein said communication frame is a frame stipulated in CCITT Recommendation H. 221 (hereinbelow termed "H. 221 frame");
   wherein said video telephone/teleconference terminal comprises resumption means for resuming video data into a picture of one picture frame so as to present a display output, said video data being contained in a plurality of groups of blocks (GOB's) of a frame stipulated in CCITT Recommendation H. 261 (hereinbelow, termed "H. 261 frame") and prepared in the received H. 221 frame., said GOB's each being a plurality of blocks into which the data area for H. 261 frames are divided;
   wherein said transmission means enters the generated video data into at least one GOB allotted to said video telephone/teleconference terminal itself, among said plurality of GOB's of said H. 261 frame prepared in said H. 221 frame; and
   wherein said cancellation means cancels video data which was entered into said H. 261 frame by said transmission means of said video telephone/teleconference terminal itself before the reception of said H. 221 frame to be relayed, from at least one GOB allotted to said video telephone/teleconference terminal itself.

14. A video telephone/teleconference terminal connectible with an ISDN, comprising:

channel setting means for setting a plurality of channels between said video telephone/teleconference terminal itself and a plurality of other video telephone/teleconference terminals in the ISDN;

generation means for generating video telephonic/teleconferential data which is to be sent to the other video telephone/teleconference terminals;

relay means for relaying a communication frame received from any of the set channels to another of the set channels;

transmission means for entering the generated video telephonic/teleconferential data into said communication frame which is to be relayed by said relay means; and cancellation means for canceling the video telephonic/teleconferential data which was entered into said communication frame by said transmission means of said video telephone/teleconference terminal itself before the reception of said communication frame, from within said communication frame which is to be relayed by said relay means;

wherein said communication frame is a frame stipulated in CCITT Recommendation H. 221 (hereinbelow, termed "H. 221 frame"), and a frame stipulated in CCITT Recommendation H. 261 (hereinbelow, termed "H. 261 frame") is prepared in said H. 221 frame;

wherein said video telephone/teleconference terminal comprises audio data resumption means for resuming audio data into speech so as to emit the speech;

wherein said generation means generates the video telephonic/teleconferential data including audio data;

wherein said cancellation means cancels an audio data component which was entered into said H. 261 frame by said transmission means of said video telephone/teleconference terminal itself before the reception of said H. 221 frame, from audio data contained in said H. 261 frame of the received H. 221 frame;

wherein said audio data resumption means resumes the audio data with said audio data component of said terminal itself cancelled by said cancellation means, into speech so as to emit said speech; and wherein said transmission means enters new audio data into said H. 261 frame to be relayed by said relay means, instead of said audio data contained in said H. 261 frame of said H. 221 frame received by said relay means, said new audio data being obtained in such a way that said audio data generated by said generation means is added to said audio data with said audio data component of said terminal itself canceled by said cancellation means.

15. In multipoint video telephone/teleconference system having a plurality of video telephone/teleconference terminals which are connected to digital communication channels and which transmit and receive communication frame containing video telephonic/teleconferential data which includes video data, through the connected digital communication channels, said multipoint teleconference system comprising:

wherein said digital communication channels connect said plurality of video telephone/teleconference terminals in a ring configuration;

wherein said communication frame includes a plurality of data blocks each of which is divided from a data area of said communication frame;

wherein said data blocks are respectively allotted to the individual video telephone/teleconference terminals; and wherein each of said video telephone/teleconference terminals comprises:

generation means for generating the video telephonic/teleconferential data which is to be sent to the other video telephone/teleconference terminals, said telephonic/teleconferential data including said video data, resumption means for resuming said video data contained in the allotted data block of the frame received from the video telephone/teleconference terminal at an upper stream position of a loop with respect to transfer of said communication frame, relay means for transmitting the received communication frame to the video telephone/teleconference terminal at a lower stream position of said loop so that said communication frame may revolve around said loop, said loop being formed of said digital communication channels which connect said plurality of video telephone/teleconference terminals to one another, cancellation means for cancelling the video data which was entered into the allotted data block of said communication frame by a video telephone/teleconference terminal itself and which has revolved around said loop, from within said communication frame which is to be relayed by said relay means, and transmission means for entering the generated video data into the allotted block of said communication frame which is to be relayed by said relay means, thereby sending said generated video data to said other video telephone/teleconference terminals which lie on said loop.

16. A video telephone/teleconference terminal connectible with a plurality of digital communication channels; wherein:

said digital communication channels transmit communication frame;

said communication frame includes a plurality of data blocks each of which is divided from a data area of said communication frame;

said data blocks are respectively allotted to individual video telephone/teleconference terminals; and said video telephone/teleconference terminal includes:

generation means for generating video telephonic/teleconferential data which is to be sent to a plurality of other video telephone/teleconference terminals, said telephonic/teleconferential data including video data, resumption means for resuming said video data contained in said communication frame received from any of a plurality of channels, relay means for relaying the received communication frame to another of said channels, cancellation means for canceling the video data which was entered into the allotted data block of said communication frame by said video telephone/teleconference terminal itself the reception of said communication frames, from within said communication frame which is to be relayed by said relay means, and transmission means for entering the generated video data into the allotted data block of said communication frame which is to be relayed by said relay means.

* * * * *